United States Patent
Miao

(10) Patent No.: US 12,101,179 B2
(45) Date of Patent: Sep. 24, 2024

(54) METHODS FOR FAST SECONDARY CELL ACTIVATION AND DEACTIVATION

(71) Applicant: Apple Inc., Cupertino, CA (US)

(72) Inventor: Honglei Miao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 17/437,751

(22) PCT Filed: Jun. 17, 2020

(86) PCT No.: PCT/US2020/038113
§ 371 (c)(1),
(2) Date: Sep. 9, 2021

(87) PCT Pub. No.: WO2020/257267
PCT Pub. Date: Dec. 24, 2020

(65) Prior Publication Data
US 2022/0166538 A1 May 26, 2022

Related U.S. Application Data

(60) Provisional application No. 62/862,508, filed on Jun. 17, 2019.

(51) Int. Cl.
*H04L 1/00* (2006.01)
*H04L 5/00* (2006.01)
(Continued)

(52) U.S. Cl.
CPC .......... *H04L 1/0025* (2013.01); *H04L 5/0051* (2013.01); *H04L 27/26025* (2021.01);
(Continued)

(58) Field of Classification Search
CPC ............ H04L 1/0025; H04W 72/0466; H04W 72/0453; H04W 72/23; H04W 80/02
See application file for complete search history.

(56) References Cited

U.S. PATENT DOCUMENTS 11,012,137 B2 * 5/2021 Cirik ................ H04W 74/0833
2016/0309504 A1 10/2016 Dinan
(Continued)

FOREIGN PATENT DOCUMENTS

| CN | 109644414 | 4/2019 |
|---|---|---|
| CN | 109792610 | 5/2019 |
| WO | WO 2019/059673 | 3/2019 |

OTHER PUBLICATIONS

[No Author Listed], "5G; NR; Medium Access Control (MAC) protocol specification (3GPP TS 38.321 version 15.3.0 Release 15)," ETSI TS 138 321 V15.3.0, Sep. 2018, 77 pages.
(Continued)

*Primary Examiner* — Mohammad S Anwar
(74) *Attorney, Agent, or Firm* — Fish & Richardson P.C.

(57) ABSTRACT

A method is performed by user equipment (UE) for communicating on a secondary cell (SCell) with fast activation or deactivation. The method includes receiving, from a serving cell, a medium access control (MAC) control element (CE) including a plurality of bits, wherein individual bits of the plurality of bits each indicate whether respective secondary cells (SCells) of a fifth generation (5G) wireless cellular network are activated or deactivated. The method includes based on a numerology of the serving cell, determining an activation delay time for one or more activated SCells indicated by the plurality of bits of the MAC CE. The method includes communicating using the one or more activated SCells based on the determined activation delay time.

13 Claims, 15 Drawing Sheets

(51) Int. Cl.
  *H04L 27/26*  (2006.01)
  *H04W 72/0446*  (2023.01)
  *H04W 72/0453*  (2023.01)
  *H04W 72/23*  (2023.01)
  *H04W 80/02*  (2009.01)

(52) U.S. Cl.
  CPC ... *H04W 72/0446* (2013.01); *H04W 72/0453* (2013.01); *H04W 72/23* (2023.01); *H04W 80/02* (2013.01)

(56) References Cited

U.S. PATENT DOCUMENTS

| | | | |
|---|---|---|---|
| 2019/0149308 A1* | 5/2019 | Son | H04L 5/0007 375/260 |
| 2020/0022095 A1* | 1/2020 | Kim | H04W 48/18 |
| 2020/0045684 A1 | 2/2020 | Futaki | |

OTHER PUBLICATIONS

[No Author Listed], "5G; NR; Medium Access Control (MAC) protocol specification (3GPP TS 38.321 version 15.4.0 Release 15)," ETSI TS 138 321, V 15.4.0, Apr. 2019, 79 pages.

[No Author Listed], "5G; NR; Radio Resource Control (RRC); Protocol specification (3GPP TS 38.331 version 15.5.1 Release 15)," ETSI TS 138 331 V15.5.1, May 2019, 488 pages.

[No Author Listed], "5G; NR; Requirements for support of radio resource management (3GPP TS 38.133 version 15.3.0 Release 15)," ETSI TS 138 133 V15.3.0, Oct. 2018, 134 pages.

[No Author Listed], "5G; NR; Requirements for support of radio resource management (3GPP TS 38.133 version 15.4.0 Release 15)," ETSI TS 138 133 V15.4.0, Apr. 2019, 868 pages.

[No Author Listed], "Radio Resource Control (RRC) protocol specification (Release 15)," 3GPP TS 38.331 V 15.4.0, Dec. 2018, 474 pages.

International Preliminary Report on Patentability in International Appln. No. PCT/US2020/038113, dated Dec. 30, 2021, 16 pages.

International Search Report and Written Opinion in International Appln. PCT/US2020/038113, dated Jan. 11, 2021, 24 pages.

Invitation to Pay Additional Fees in International Appln. No. PCT/US2020/038113, dated Oct. 26, 2020, 21 pages.

Alcatel-Lucent et al., Consideration of New L1 signaling for transition time reduction of SCell Activation for Small Cell On/Off, 3GPP TSG RAN WG1 Meeting #77, R1-142042, Seoul, South Korea, May 19-23, 2014, 6 pages.

* cited by examiner

FIG. 12

METHODS FOR FAST SECONDARY CELL ACTIVATION AND DEACTIVATION

CROSS-REFERENCE TO RELATED APPLICATION

This application claims priority to U.S. Provisional Patent Application No. 62/862,508, titled METHODS FOR FAST SECONDARY CELL ACTIVATION AND DEACTIVATION, filed Jun. 17, 2019, the entire content of which is incorporated herein by reference.

TECHNICAL FIELD

This disclosure relates generally to timing adjustment of uplink transmissions in wireless communications.

BACKGROUND

Wireless communication systems are rapidly growing in usage. Further, wireless communication technology has evolved from voice-only communications to also include the transmission of data, such as Internet and multimedia content, to a variety of devices. To accommodate a growing number of devices communicating both voice and data signals, many wireless communication systems share the available communication channel resources among devices.

SUMMARY

In 3GPP Rel-15 new radio (NR) wireless communication networks, the carrier aggregation (CA) activation or deactivation command is sent in medium access control (MAC) control element (CE), as discussed in 3GPP TS 38.321, NR, Medium Access Control (MAC) protocol specification (Release 15), version 15.4.0, published in April 2019, incorporated in entirety by reference herein. Generally, the minimum required activation delay is about 5 milliseconds (ms) for a typical activation or deactivation scenario. In comparison with other NR procedures, the 5 ms delay time is relatively long. Furthermore, the maximum allowed activation delays, described in 3GPP TS 38.133, NR, Requirements for support of radio resource management (Release 15), Version 15.4.0, published in April 2019, incorporated in entirety by reference herein, yield big concern for CA operation for the services with stringent latency requirements, and similar issues already existed for long term evolution (LTE) CA operation. Due to such long delays, it is risky for the NR network to frequently deactivate the secondary cells (SCell) due to the fact that reconfiguring the UE back to the SCell-activated state can take any time from a minimum of ~5 ms to a maximum allowed value of tens or hundreds of milliseconds, depending on the specific scenario and UE implementation.

One new key element in NR is to enable the possibility of utilizing much larger spectrum bandwidths, ultimately leading to about 10 times higher peak data rates than for LTE. Delays in accessing the high capacity (small) cells are detrimental to the performance and in NR this can be even more pronounced (e.g. especially if the macro is still LTE). In order to fully take advantage on the large bandwidth (BW) possibilities, efficient and fast utilization of the large BW should be ensured in all cases, including initial connection establishment, reconfiguration of CA and dual connectivity (DC) and addition of secondary cells.

The embodiments described in this specification include one or more of the following advantages. This specification describes configuring a UE for communication using SCells in which activation or deactivation uses only a few timing slots, and far less than 5 ms of time for activation or deactivation of the SCells. Specifically, the methods described in this specification are configured to efficiently and dynamically signal the fast SCell activation or deactivation and significantly reduce the activation and deactivation timing delay of SCells. As a result, SCell activation and deactivation can be achieved at the timing slot level so that a NR carrier aggregation/dual connectivity (CA/DC) procedure can operate more efficiently according to the traffic needs and bandwidth availability.

In a general aspect, a process for communicating, by user equipment (UE), on a secondary cell (SCell) with fast activation or deactivation includes receiving, from a serving cell, a medium access control (MAC) control element (CE) including a plurality of bits. The individual bits of the plurality of bits each indicate whether respective secondary cells (SCells) of a fifth generation (5G) wireless cellular network are activated or deactivated. The process includes, based on a numerology of the serving cell, determining an activation delay time for one or more activated SCells indicated by the plurality of bits of the MAC CE. The process includes communicating using the one or more activated SCells based on the determined activation delay time.

In some implementations, the determined activation delay time is less than 5 milliseconds. In some implementations, the determined activation delay time is based on physical downlink shared channel (PDSCH) to hybrid automatic repeat request acknowledgement (HARQ-ACK) response delay that is signaled in downlink control information (DCI).

In some implementations, the numerology includes a subcarrier spacing or a symbol length used by the serving cell.

In some implementations, the MAC CE includes a MAC PDU subheader with a logical channel ID (LCD) to indicate a size of the MAC CE. In some implementations, the size pf the MAC CE is either one octet or four octets. In some implementations, the LCD is not included in a set of LCIDs used for a 3GPP Release 15 SCell activation or deactivation timing.

In some implementations, the MAC CE includes an indicator to indicate that the activation delay time is to be determined based on the numerology of the serving cell. In some implementations, the indicator is a single bit. In some implementations, the MAC CE is a first MAC CE, wherein the indicator is a first indicator with a first value, wherein the activation delay time is a first activation delay time. In this example, the process includes receiving a second MAC CE with a second indicator to indicate that a second activation delay time is to be used for one or more activated SCells indicated by the second MAC CE. In some implementations, the second activation delay time is determined according to a 3GPP Release 15 procedure.

In a general aspect, a process for communicating, by user equipment (UE), on a secondary cell (SCell) with fast activation or deactivation includes receiving downlink control information (DCI) indicating deactivation of an SCell of a fifth generation (5G) wireless cellular network. Generally, the DCI includes one or more the following. The DCI includes a channel state information (CSI) report indicator to indicate whether the UE is to perform CSI reporting for the deactivated SCell. The DCI includes a physical uplink control channel (PUCCH) transmission indicator to indicate whether PUCCH resources on the SCell, if configured, are still available for PUCCH transmission. The DCI includes a sounding reference signal (SRS) transmission indicator to indicate whether the UE is to transmit configured SRS in the deactivated SCell. The process includes communicating on the wireless cellular network based on the DCI.

In some implementations, the process includes entering an SCell deactivation mode based on the DCI. When in the SCell deactivation mode, the process includes monitoring for an SCell activation DCI to indicate that the SCell is activated.

In some implementations, the process includes entering the SCell deactivation mode in a next subframe after a first subframe in which the DCI is received.

In some implementations, the process includes receiving configuration information for monitoring for the SCell activation DCI. In some implementations, the SCell activation DCI indicates whether the SCell is activated or whether the SCell is to remain in a deactivated state. In some implementations, the process includes receiving the SCell activation DCI. The process includes activating the SCell based on the SCell activation DCI.

In some implementations, the includes activation information for multiple SCells.

In a general aspect, a UE is configured to communicate with a next generation node (gNB) on a fifth generation (5G) wireless network. The UE configured to perform operations comprising: receiving, from a serving cell, a medium access control (MAC) control element (CE) including a plurality of bits. Individual bits of the plurality of bits each indicate whether respective secondary cells (SCells) of a fifth generation (5G) wireless cellular network are activated or deactivated. Based on a numerology of the serving cell, the UE is configured for determining an activation delay time for one or more activated SCells indicated by the plurality of bits of the MAC CE. The UE is configured for communicating using the one or more activated SCells based on the determined activation delay time.

In some implementations, the determined activation delay time is based on physical downlink shared channel (PDSCH) to hybrid automatic repeat request acknowledgement (HARQ-ACK) response delay that is signaled in downlink control information (DCI).

The details of one or more implementations are set forth in the accompanying drawings and the description below. Other features and advantages will be apparent from the description and drawings, and from the claims.

BRIEF DESCRIPTION OF DRAWINGS

FIGS. 11 and 12 show illustrations of example enhanced MAC CEs for secondary cell activation/deactivation for the timing shown in FIG. 8.

Like reference symbols in the various drawings indicate like elements.

DETAILED DESCRIPTION

Figure 1:
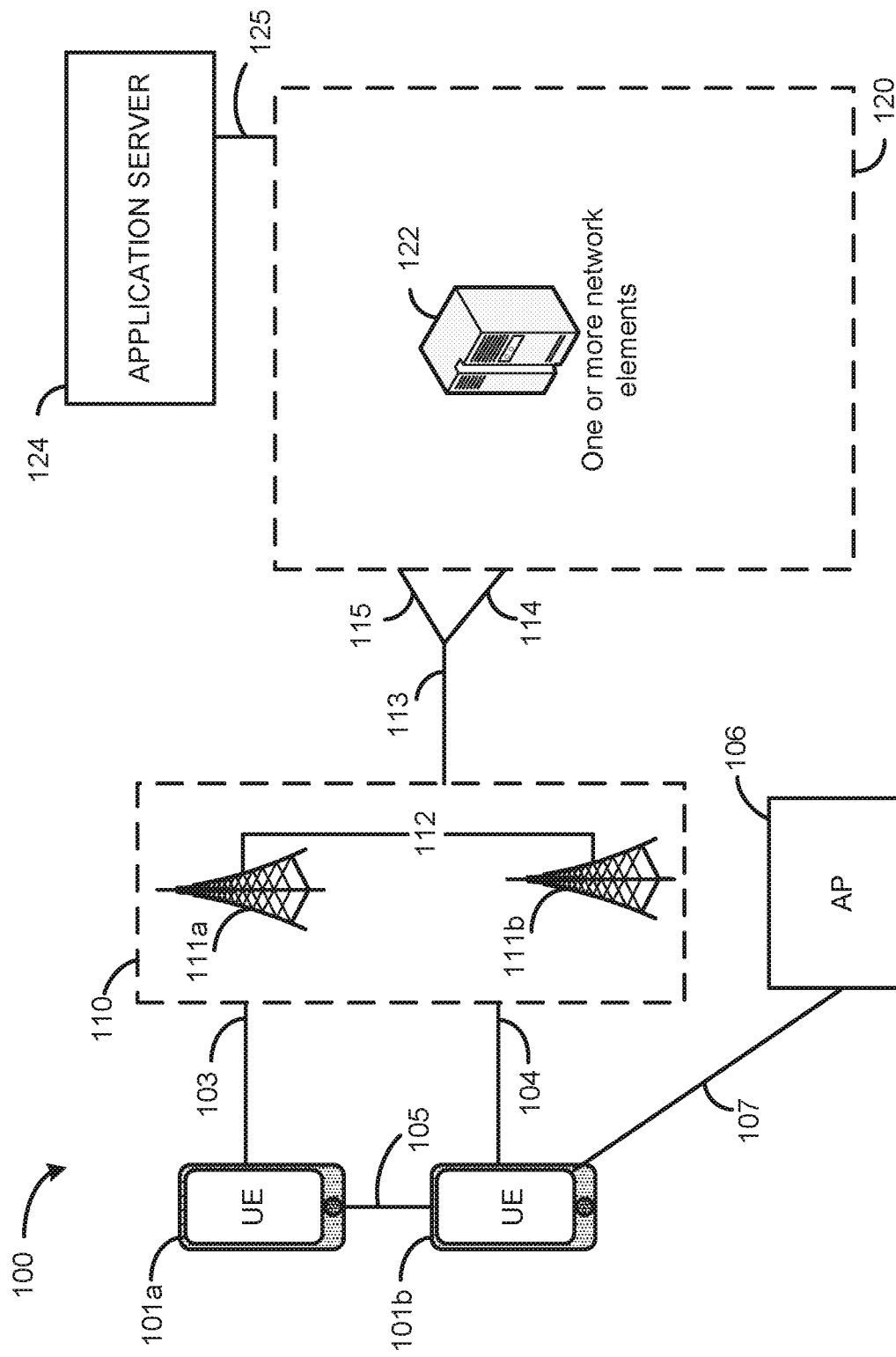
FIG. 1 illustrates an example wireless communication system.

This specification describes processes to enable fast secondary cell (SCell) activation and/or deactivation. The fast SCell activation and/or deactivation reduces SCell activation and deactivation delay by at least several tens of milliseconds (ms) to one or more time slots for transmissions with the SCell.

A first example process includes a new Medium Access Control (MAC) control element (CE) for fast secondary cell activation and/or deactivation at the slot level. In this example, the activation delay time depends on the numerology of a serving cell activating the SCell. In other words, the delay time depends on the sub-carrier spacing in the NR as a function of $f=15$ kHz$*2^n$, where n is the numerology sub-carrier spacing step. In this circumstance, the MAC CE is used for fast SCell activation and/or deactivation on slot level timing. The MAC CE is signaled by a logical channel ID. A user equipment (UE) configures the channel ID for the MAC CE for fast SCell activation and/or deactivation (activation/deactivation). This occurs at a given slot, such as slot n. The UE begins to transmit a Channel State Information (CSI) report at slot n+k1+1, where k1 stands for the delay caused by the physical downlink shared channel (PDCCH) to hybrid automatic repeat request acknowledgement (HARQ-ACK) response that is signaled in downlink control information (DCI). The UE also monitors a physical downlink control channel (PDCCH) reception.

A second example process includes an enhanced MAC CE for SCell activation/deactivation. In this method, the SCell activation/deactivation MAC CE described in 3GPP TS 38.321 can be enhanced to support a typical SCell activation/deactivation procedure with the SCell activation/deactivation delay and fast SCell activation/deactivation delay as previously described in the first example. As such, the enhanced MAC CEs can be identified by the logical channel IDs (LCIDs) for the MAC CE described in 3GPP TS 38.321.

A third example process includes a SCell activation/deactivation operation based on downlink control information (DCI). In this method, a newly defined DCI field or a redefined DCI field (from the DCI of 3GPP TS 38.321) indicates a SCell activation/deactivation command. When a UE receives the SCell deactivation command at a given at slot n, the UE can immediately enter the SCell deactivation mode at slot n+1. When remaining SCells are in a state of deactivation, the UE can monitor the configured SCell activation DCI to determine whether to activate that SCell or to allow the SCell to remain in the deactivated state. The periodicity of a configured SCell activation DCI search space (SS) can be set to the maximum allowed latency value for a given service with the most stringent latency requirement relative to other available services.

As previously described, these processes are configured to efficiently and dynamically signal fast SCell activation/deactivation and significantly (e.g., by tens of milliseconds) reduce the activation/deactivation delay of SCells. As a result, SCell activation/deactivation can occur at the slot level so that New Radio (NR) carrier aggregation/dual connectivity (CA/DC) procedures can operate more efficiently according to the traffic needs and bandwidth availability, relative to when activation/deactivation does not occur at the slot level.

FIG. 1 illustrates an example wireless communication system 100. For purposes of convenience and without limitation, the example system 100 is described in the context of the LTE and 5G NR communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., INMAN, WiMAX, etc.), or the like.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some examples, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with an access network (AN) or radio access network (RAN) 110. In some examples, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols. In some examples, the UEs 101 may directly exchange communication data using an interface 105, such as a ProSe interface. The interface 105 may alternatively be referred to as a sidelink interface 105 and may include one or more logical channels, such as a physical sidelink control channel (PSDCH), a physical sidelink shared channel (PSSCH), a physical sidelink downlink channel (PSDCH), or a physical sidelink broadcast channel (PSDCH), or combinations of them, among others.

The UE 101b is shown to be configured to access an access point (AP) 106 (also referred to as "WLAN node 106," "WLAN 106," "WEAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi®) router. In this example, the AP 106 is shown to be connected to the Internet without connecting to the core network of the wireless system, as described in further detail below. In various examples, the UE 101b, RAN HO, and AP 106 may be configured to use LTE-WLAN aggregation (LWA) operation or LTW/WAN/LAN radio level integration with IPsec tunnel (LWIP) operation. The LWA operation may involve the UE 101b in RRC_CONNECTED being configured by a RAN node 111a, 111b to utilize radio resources of LTE and WLAN. LWIP operation may involve the UE 101b using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some examples, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some examples, some or all of the RAN nodes 111 may be implemented as one or more software entities running on server computers as part of a virtual network, which may be referred to as a cloud RAN (CRAN) or a virtual baseband unit pool (vBBUP). The GRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some examples, an individual RAN node 111 may represent individual gNB distributed units (DUs) that are connected to a gNB central unit (CU) using individual F1 interfaces (not shown in FIG. 1). In some examples, the gNB-DUs may include one or more remote radio heads or RFEMs (see, e.g., FIG. 2), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the HEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) HE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some examples, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

Any of the RAN nodes 111 can terminate the air interface protocol and can be the first point of contact for the UEs 101, In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink and ProSe or sidelink communications), although the scope of the techniques described here not limited in this respect. The OFDM signals can comprise a plurality of orthogonal subcarriers.

In some examples, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

In some examples, the UEs 101 and the RAN nodes 111 communicate (e.g., transmit and receive) data over a licensed medium (also referred to as the "licensed spectrum" or the "licensed band") and an unlicensed shared medium (also referred to as the "unlicensed spectrum" or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 101 and the RAN nodes 111 may operate using license assisted access (LAA), enhanced-LAA (eLAA), or further enhanced-LAA (feLAA) mechanisms. In these implementations, the UEs 101 and the RAN nodes 111 may perform one or more known medium-sensing operations or carrier-sensing operations, or both, to determine whether one or more channels in the unlicensed spectrum are unavailable or otherwise occupied prior to transmitting in the unlicensed spectrum. The medium/carrier sensing operations may be performed according to a listen-before-talk (LBT) protocol. LBT is a mechanism in which equipment (for example, UEs 101, RAN nodes 111) senses a medium (for example, a channel or carrier frequency) and transmits when the medium is sensed to be idle (or when a specific channel in the medium is sensed to be unoccupied). The medium sensing operation may include clear channel assessment (CCA), which uses energy detection to determine the presence or absence of other signals on a channel in order to determine if a channel is occupied or clear. This LBT mechanism allows cellular/ IAA networks to coexist with incumbent systems in the unlicensed spectrum and with other LAA networks, Energy detection may include sensing RF energy across an intended transmission band for a period of time and comparing the sensed RF energy to a predefined or configured threshold.

The incumbent systems in the 5 GHz band can be WLANs based on IEEE 802.11 technologies, WLAN employs a contention-based channel access mechanism (e.g., CSMA with collision avoidance (CSMA/CA)). In some examples, when a WLAN node (e.g., a mobile station (MS), such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value as the transmission succeeds. In some examples, the LBT mechanism designed for LAA is similar to the CSMA/CA of WLAN, In some examples, the LBT procedure for DL or transmission bursts, including PDSCH or PUSCH transmissions, respectively, may have an LAA contention window that is variable in length between X and Y extended CAA (SCCA) slots, where X and Y are minimum and maximum values for the CWSs for LAA. In one example, the minimum CWS for an LAA transmission may be 9 microseconds (μs); however, the size of the CWS and a maximum channel occupancy time (for example, a transmission burst) may be based on governmental regulatory requirements.

In some examples, the LAA mechanisms are built on carrier aggregation technologies of LTE-Advanced systems. In CA, each aggregated carrier is referred to as a component carrier. In some examples, a component carrier may have a bandwidth of 1.4, 3, 5, 10, 15 or 20 MHz, and a maximum of five component carriers can be aggregated to provide a maximum aggregated bandwidth is 100 MHz. In frequency division duplex (FDD) systems, the number of aggregated carriers can be different for DL and UL. For example, the number of UL component carriers can be equal to or lower than the number of DL component carriers. In some cases, individual component carriers can have a different bandwidth than other component carriers. In time division duplex (TDD) systems, the number of component carriers as well as the bandwidths of each component carrier is usually the same for DL and UL.

Carrier aggregation can also include individual serving cells to provide individual component carriers. The coverage of the serving cells may differ, for example, because component carriers on different frequency bands may experience different path loss. A primary service cell (PCell) may provide a primary component carrier for both UL and DL, and may handle RRC and non-access stratum (NAS) related activities. The other serving cells are referred to as secondary component carriers (SCells), and each SCell may provide an individual secondary component carrier for both UL and DL. The secondary component carriers may be added and removed as required, while changing the primary component carrier may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and hybrid automatic repeat request (HARQ) information related to the uplink shared channel. Downlink scheduling (e.g., assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses control channel elements (CCEs) to convey the control information. Before being mapped to resource elements, the PDCCH complex-valued symbols may first be organized into quadruplets, which may then be permuted using a sub-block interleaver for rate matching. In some examples, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. In LTE, there can be four or more different PDCCH formats defined with different numbers of CCEs (e.g., aggregation level, L=1, 2, 4, or 8).

Some implementations may use concepts for resource allocation for control channel information that are an extension of the above-described concepts. For example, some implementations may utilize an enhanced PDCCH (EPDCCH) that uses PDSCH resources for control information transmission. The EPDCCH may be transmitted using one or more enhanced CCEs (ECCEs). Similar to above, each ECCE may correspond to nine sets of four physical resource elements collectively referred to as an enhanced REG (EREG). An ECCE may have other numbers of EREGs in some examples.

The RAN nodes 111 are configured to communicate with one another using an interface 112. In examples, such as where the system 100 is an LTE system (e.g., when the core network 120 is an evolved packet core (EPC) network), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some examples, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

In some examples, such as where the system 100 is a 5G NR system (e.g., when the core network 120 is a 5G core network), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some examples, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support may include context transfer from an old (source) serving RAN node 111 to new (target) serving RAN node 111, and control of user plane tunnels between old (source) serving RAN node 111 to new (target) serving RAN node 111. A protocol stack of the Xn-U may include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack may include an application layer signaling protocol (referred to as Xn Application Protocol (Xn-AP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and may include components to read and execute instructions from a machine-readable or computer-readable medium (e.g., a non-transitory machine-readable storage medium). In some examples, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

Generally, an application server 130 may be an element offering applications that use IP bearer resources with the core network (e.g., UNITS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120.

In some examples, the CN 120 may be a 5G core network (referred to as "5GC 120"), and the RAN 110 may be connected with the CN 120 using a next generation interface 113. In some examples, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs).

In some examples, the CN 120 may be an EPC (referred to as "EPC 120" or the like), and the RAN 110 may be connected with the CN 120 using an S1 interface 113. In some examples, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

Figure 2:
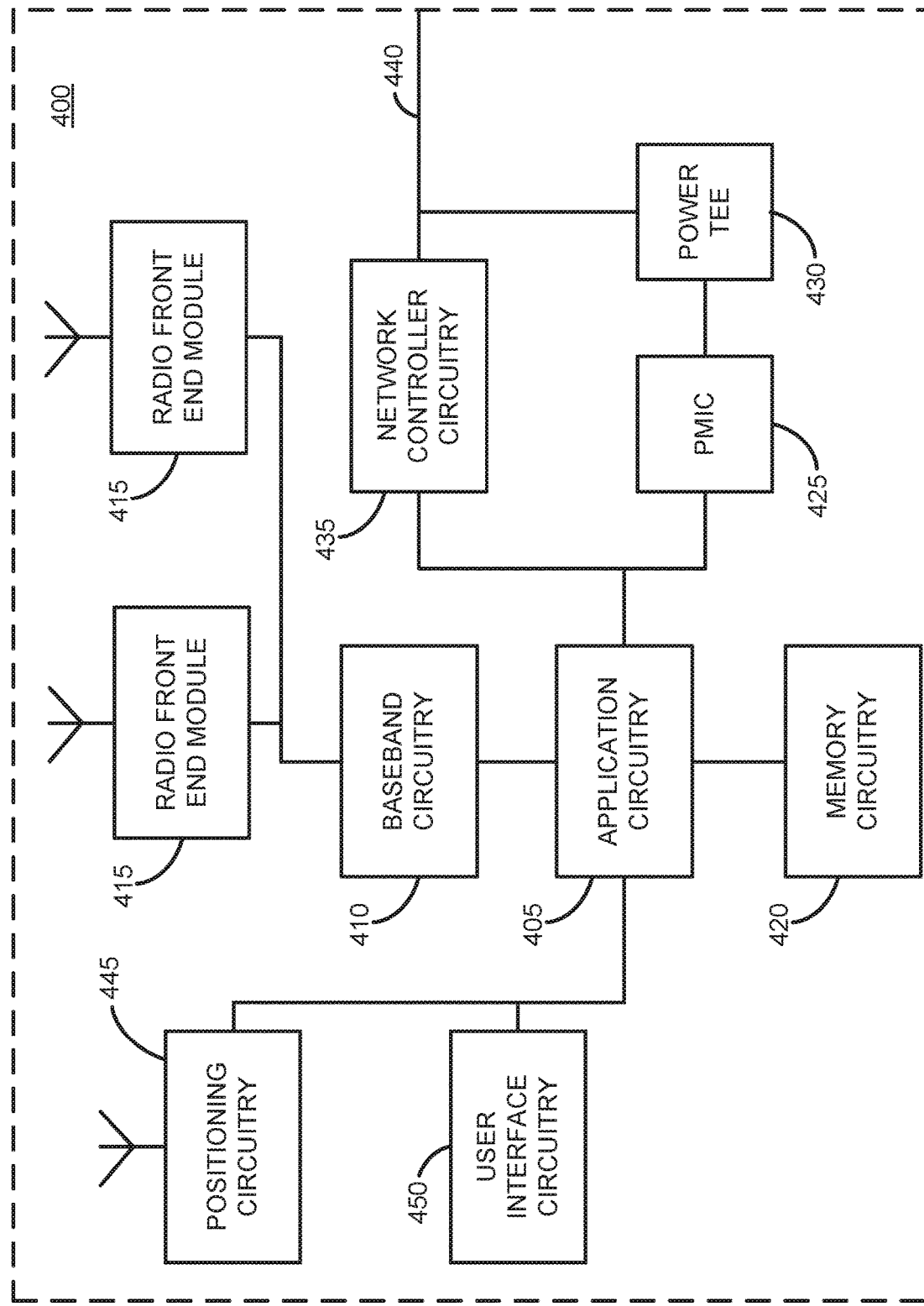
FIG. 2 illustrates an example of infrastructure equipment.

FIG. 2 illustrates an example of infrastructure equipment 400. The infrastructure equipment 400 (or "system 400") may be implemented as a base station, a radio head, a RAN node, such as the RAN nodes 111 or AP 106 shown and described previously, an application server(s) 130, or any other component or device described herein. In other examples, the system 400 can be implemented in or by a UE.

The system 400 includes application circuitry 405, baseband circuitry 410, one or more radio front end modules (RFEMs) 415, memory circuitry 420, power management integrated circuitry (MX) 425, power tee circuitry 430, network controller circuitry 435, network interface connector 440, satellite positioning circuitry 445, and user interface circuitry 450. In some examples, the system 400 may include additional elements such as, for example, memory, storage, a display, a camera, one or more sensors, or an input/output (I/O) interface, or combinations of them, among others. In other examples, the components described with reference to the system 400 may be included in more than one device. For example, the various circuitries may be separately included in more than one device for CRAIG, vBBU, or other implementations.

The application circuitry 405 includes circuitry such as, but not limited to, one or more processors (or processor cores), cache memory, one or more low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor interface (MIPI) interfaces and Joint Test Access Group (JTAG) test access ports. The processors (or cores) of the application circuitry 405 may be coupled with or may include memory or storage elements and may be configured to execute instructions stored in the memory or storage to enable various applications or operating systems to run on the system 400. In some examples, the memory or storage elements may include on-chip memory circuitry, which may include any suitable volatile or non-volatile memory, such as DRAM, SRAM, EPROM, EEPROM, Flash memory, solid-state memory, or combinations of them, among other types of memory.

The processor(s) of the application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or combinations of them, among others. In some examples, the application circuitry 405 may include, or may be, a special-purpose processor or controller configured to carry out the various techniques described here. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as IN/IIPS Warrior P-class processors; and/or the like. In some examples, the system 400 may not utilize application circuitry 405, and instead may include a special-purpose processor or controller to process IP data received from an EPC or 5GC, for example.

In some examples, the application circuitry 405 may include one or more hardware accelerators, which may be microprocessors, programmable processing devices, or the like. The one or more hardware accelerators may include, for example, computer vision (CV) or deep learning (DL) accelerators, or both. In some examples, the programmable processing devices may be one or more a field-programmable devices (FPDs) such as field-programmable gate arrays (FPGAs) and the like; programmable logic devices (PLDs) such as complex PLDs (CPLDs) or high-capacity PLDs (HCPLDs); ASICs such as structured ASICs; programmable SoCs (PSoCs), or combinations of them, among others. In such implementations, the circuitry of application circuitry 405 may include logic blocks or logic fabric, and other interconnected resources that may be programmed to perform various functions, such as the procedures, methods, functions described herein. In some examples, the circuitry of application circuitry 405 may include memory cells (e.g., erasable programmable read-only memory (EPROM), electrically erasable programmable read-only memory (EEPROM), flash memory, static memory (e.g., static random access memory (SRAM) or anti-fuses)) used to store logic blocks, logic fabric, data, or other data in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed with regard to FIG. 4.

The user interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces may include, but are not limited to, a nonvolatile memory port, a universal serial bus (USB) port, an audio jack, a power supply interface, among others.

The radio front end modules (RFEMs) 415 may include a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 611 of FIG. 6), and the RFEM may be connected to multiple antennas. In some examples, both mmWave and sub-mmWave radio functions may be implemented in the same physical RFEM 415, which incorporates both mmWave antennas and sub-mmWave.

The memory circuitry 420 may include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. In some examples, the memory circuitry 420 may include three-dimensional (3D) cross-point (XPOINT) memories from Intel® and Micron®. Memory circuitry 420 may be implemented as one or more of solder down packaged integrated circuits, socketed memory modules and plug-in memory cards, for example.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to and from the infrastructure equipment 400 using network interface connector 440 using a physical connection, which may be electrical (commonly referred to as a "copper interconnect"), optical, or wireless. The network controller circuitry 435 may include one or more dedicated processors or FPGAs, or both, to communicate using one or more of the aforementioned protocols. In some examples, the network controller circuitry 435 may include multiple controllers to provide connectivity to other networks using the same or different protocols.

The positioning circuitry 445 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), among other systems. The positioning circuitry 445 can include various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 445 may include a Micro-Technology for Positioning, Navigation, and Timing (Micro-PNT) IC that uses a master timing clock to perform position tracking and estimation without GNSS assistance. The positioning circuitry 445 may also be part of, or interact with, the baseband circuitry 410 or RFEMs 415, or both, to communicate with the nodes and components of the positioning network. The positioning circuitry 445 may also provide data (e.g., position data, time data) to the application circuitry 405, which may use the data to synchronize operations with various infrastructure (e.g., RAN nodes 111).

The components shown by FIG. 2 may communicate with one another using interface circuitry, which may include any number of bus or interconnect (IX) technologies such as industry standard architecture (ISA), extended ISA (EISA), peripheral component interconnect (PCI), peripheral component interconnect extended (PCIx), PCI express (PCIe), or any number of other technologies. The bus or IX may be a proprietary bus, for example, used in a SoC based system. Other bus or IX systems may be included, such as an I2C interface, an SPI interface, point to point interfaces, and a power bus, among others.

Figure 3:
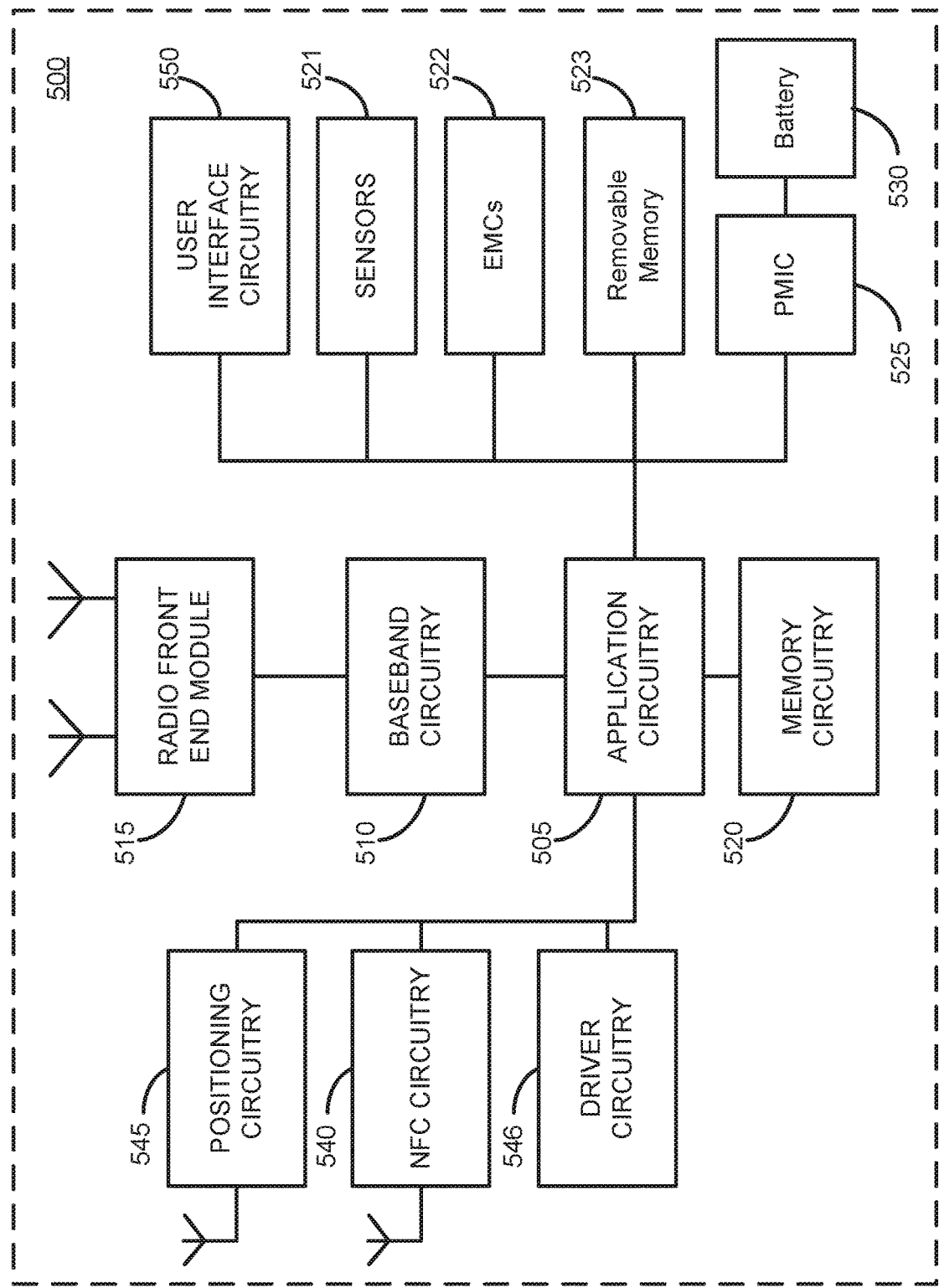
FIG. 3 illustrates an example of a platform or device.
Figure 5:
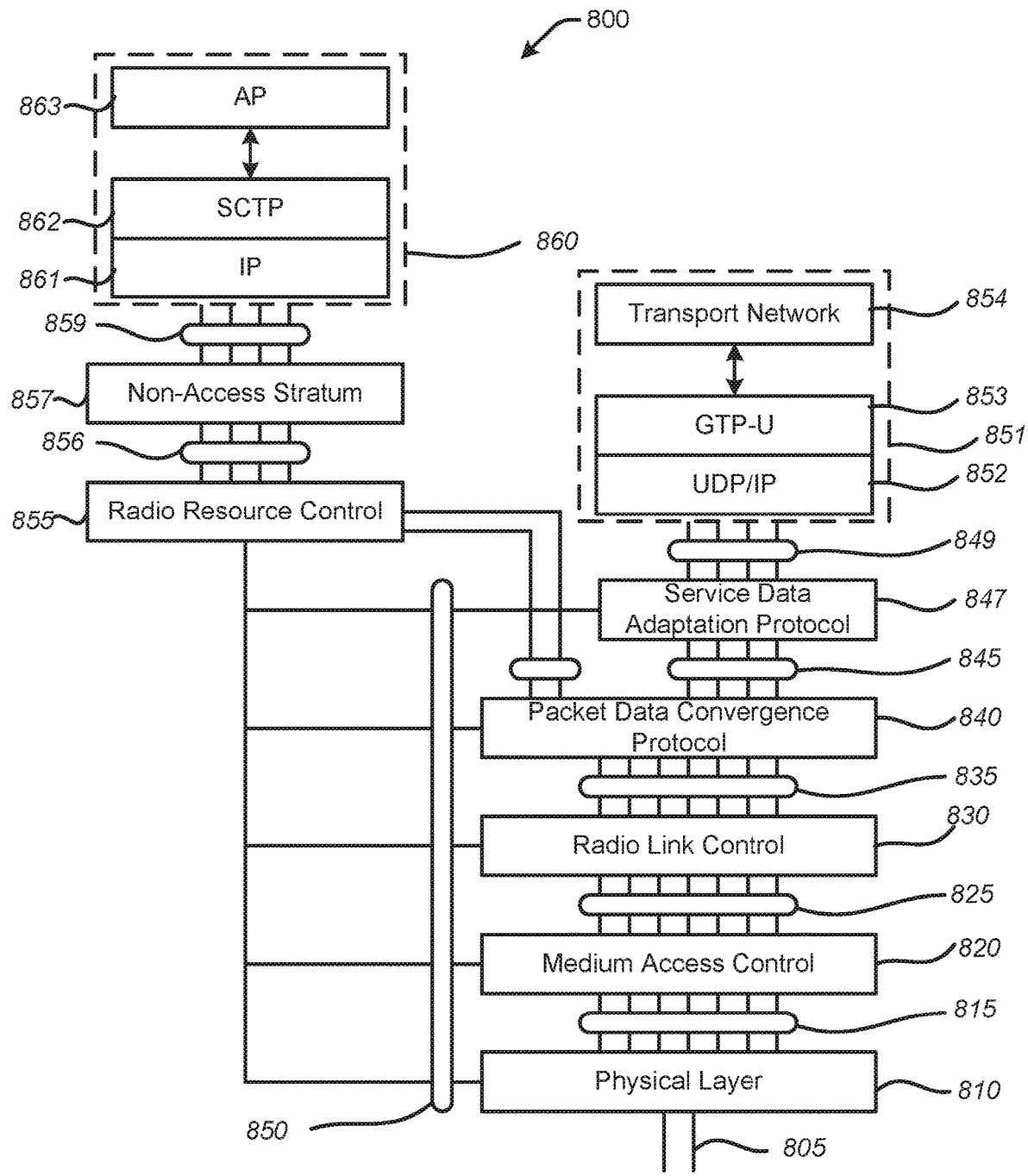
FIG. 5 illustrates example protocol functions that may be implemented in wireless communication systems.

FIG. 3 illustrates an example of a platform 500 (or "device 500"). In some examples, the computer platform 500 may be suitable for use as UEs 101, 201, 301, application servers 130, or any other component or device discussed herein. The platform 500 may include any combinations of the components shown in the example. The components of platform 500 (or portions thereof) may be implemented as integrated circuits (ICs), discrete electronic devices, or other modules, logic, hardware, software, firmware, or a combination of them adapted in the computer platform 500, or as components otherwise incorporated within a chassis of a larger system. The block diagram of FIG. 5 is intended to show a high level view of components of the platform 500. However, in some examples, the platform 500 may include fewer, additional, or alternative components, or a different arrangement of the components shown in FIG. 5.

The application circuitry 505 includes circuitry such as, but not limited to, one or more processors (or processor cores), cache memory, and one or more of LDOs, interrupt controllers, serial interfaces such as SRI, I2C or universal programmable serial interface module, RTC, timer-counters including interval and watchdog timers, general purpose I/O, memory card controllers such as SD MMC or similar, USB interfaces, MIPI interfaces, and HAG test access ports. The processors (or cores) of the application circuitry 505 may be coupled with or may include memory/storage elements and may be configured to execute instructions stored in the memory or storage to enable various applications or operating systems to run on the system 500. In some examples, the memory or storage elements may be on-chip memory circuitry, which may include any suitable volatile or non-volatile memory, such as DRAM, SRAM, EPROM, EEPROM, Flash memory, solid-state memory, or combinations of them, among other types of memory.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the application circuitry 405 may include, or may be, a special-purpose processor/controller to carry out the techniques described herein.

As examples, the processor(s) of application circuitry 505 may include an Apple A-series processor. The processors of the application circuitry 505 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMI)) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 may be a part of a system on a chip (SoC) in which the application circuitry 505 and other components are formed into a single integrated circuit.

Additionally or alternatively, the application circuitry 505 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some examples, the application circuitry 505 may include logic blocks or logic fabric, and other interconnected resources that may be programmed to perform various functions, such as the procedures, methods, functions described herein. In some examples, the application circuitry 505 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed with regard to FIG. 4.

The RFEMs 515 may comprise a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 611 of FIG. 4), and the RFEM may be connected to multiple antennas. In some examples, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory, such as random access memory (RAM), dynamic RAM (DRAM) or synchronous dynamic RAM (SDRAM), and nonvolatile memory (WM), such as high-speed electrically erasable memory (commonly referred to as Flash memory), phase change random access memory (PRAM), or magnetoresistive random access memory (MRAM), or combinations of them, among others. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, or soldered onto a motherboard using a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, for example, a solid state disk drive (SSDD), hard disk drive (HDD), a micro HDD, resistance change memories, phase change memories, holographic memories, or chemical memories, among others. In some examples, the computer platform 500 may incorporate the three-dimensional (3D) cross-point (XPOINT) memories from Intel® and Micron®.

The removable memory circuitry 523 may include devices, circuitry, enclosures, housings, ports or receptacles, among others, used to couple portable data storage devices with the platform 500. These portable data storage devices may be used for mass storage purposes, and may include, for example, flash memory cards (e.g., Secure Digital (SD) cards, microSD cards, xD picture cards), and USB flash drives, optical discs, or external HDDs, or combinations of them, among others.

The platform 500 may also include interface circuitry (not shown) for connecting external devices with the platform 500. The external devices connected to the platform 500 using the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 522 include devices, modules, or subsystems whose purpose is to enable the platform 500 to change its state, position, or orientation, or move or control a mechanism, system, or subsystem. Additionally, the EMCs 522 may be configured to generate and send messages or signaling to other components of the platform 500 to indicate a current state of the EMCs 522. Examples of the EMCs 522 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electro-mechanical components. In some examples, the platform 500 is configured to operate one or more EMCs 522 based on one or more captured events, instructions, or control signals received from a service provider or clients, or both.

In some examples, the interface circuitry may connect the platform 500 with positioning circuitry 545. The positioning circuitry 545 includes circuitry to receive and decode signals transmitted or broadcasted by a positioning network of a GNSS. Examples of a GNSS include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, among other systems. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 545 may include a. Micro-PNT IC that uses a master timing clock to perform position tracking or estimation without GNSS assistance. The positioning circuitry 545 may also be part of, or interact with, the baseband circuitry 410 or RFEMs 515, or both, to communicate with the nodes and components of the positioning network. The positioning circuitry 545 may also provide data position data, time data) to the application circuitry 505, which may use the data to synchronize operations with various infrastructure (e.g., radio base stations), for turn-by-turn navigation applications, or the like.

In some examples, the interface circuitry may connect the platform 500 with Near-Field Communication (NEC) circuitry 540. The NFC circuitry 540 is configured to provide contactless, short-range communications based on radio frequency identification (RFID) standards, in which magnetic field induction is used to enable communication between NFC circuitry 540 and NEC-enabled devices external to the platform 500 (e.g., an "NFC touchpoint"). The NFC circuitry 540 includes an NFC controller coupled with an antenna element and a processor coupled with the NEC controller. The NEC controller may be a chip or IC providing NFC functionalities to the NEC circuitry 540 by executing NEC controller firmware and an NFC stack. The NFC stack may be executed by the processor to control the NFC controller, and the NEC controller firmware may be executed by the NFC controller to control the antenna element to emit short-range RF signals. The RF signals may power a passive NEC tag (e.g., a microchip embedded in a sticker or wristband) to transmit stored data to the NFC circuitry 540, or initiate data transfer between the NEC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, the driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may be included when the platform 500 is capable of being powered by a battery 530, for example, when the device is included in a UE 101, 201, 301.

In some examples, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback or handover. This can allow the platform 500 to enter a very low power state, where it periodically wakes up to listen to the network and then powers down again. In some examples, the platform 500 may not receive data in the RRC_Idle state and instead must transition back to RRC_Connected state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 530 may power the platform 500, although in some examples the platform 500 may be deployed in a fixed location, and may have a power supply coupled to an electrical grid. The battery 530 may be a lithium ion battery, a metal-air battery, such as a zinc-air battery, an aluminum-air battery, or a lithium-air battery, among others. In some examples, such as in V2X applications, the battery 530 may be a typical lead-acid automotive battery.

In some examples, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, or sensing frequency, among others.

A power block, or other power supply coupled to an electrical grid may be coupled with the BMS to charge the battery 530. In some examples, the power block 530 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

The user interface circuitry 550 includes various input/output (110) devices present within, or connected to, the platform 500, and includes one or more user interfaces designed to enable user interaction with the platform 500 or peripheral component interfaces designed to enable peripheral component interaction with the platform 500. The user interface circuitry 550 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry may include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Chrystal Displays (LCD), LEI) displays, quantum dot displays, or projectors), with the output of characters, graphics, or multimedia objects being generated or produced from the operation of the platform 500. The output device circuitry may also include speakers or other audio emitting devices, or printer(s). In some examples, the sensor circuitry 521 may be used as the input device circuitry (e.g., an image capture device or motion capture device), and one or more EMCs may be used as the output device circuitry (e.g., an actuator to provide haptic feedback). In another example, NEC circuitry comprising an NFC controller coupled with an antenna element and a processing device may be included to read electronic tags or connect with another NTC-enabled device. Peripheral component interfaces may include, but are not limited to, a non-volatile memory port, a USB port, an audio jack, or a power supply interface.

Although not shown, the components of platform 500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus or IX may be a proprietary bus or IX, for example, used in a SoC based system. Other bus or IX systems may be included, such as an I2C interface, an SPI interface, point-to-point interfaces, and a power bus, among others.

Figure 4:
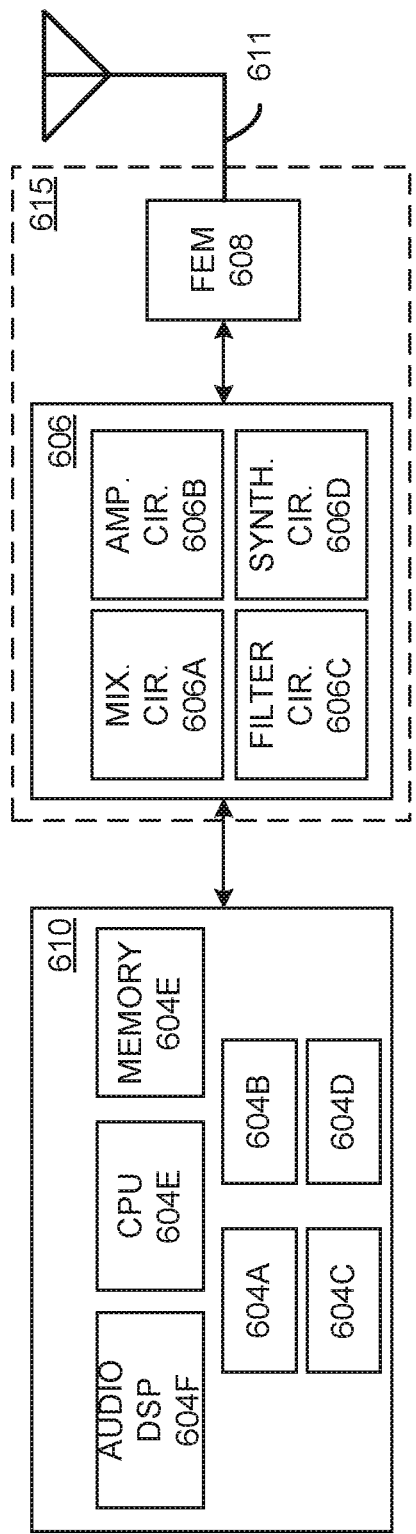
FIG. 4 illustrates example components of baseband circuitry and radio front end circuitry.

FIG. 4 illustrates example components of baseband circuitry 610 and radio front end modules (RFEM) 615. The baseband circuitry 610 can correspond to the baseband circuitry 410 and 510 of FIGS. 4 and 5, respectively. The RFEM 615 can correspond to the RFEM 415 and 515 of FIGS. 4 and 5, respectively. As shown, the RFEMs 615 may include Radio Frequency (RF) circuitry 606, front-end module (FEM) circuitry 608, antenna array 611 coupled together.

The baseband circuitry 610 includes circuitry or control logic, or both, configured to carry out various radio or network protocol and control functions that enable communication with one or more radio networks using the RF circuitry 606. The radio control functions may include, but are not limited to, signal modulation and demodulation, encoding and decoding, and radio frequency shifting. In some examples, modulation and demodulation circuitry of the baseband circuitry 610 may include Fast-Fourier Transform (FFT), preceding, or constellation mapping and demapping functionality. In some examples, encoding and decoding circuitry of the baseband circuitry 610 may include convolution, tail-biting convolution, turbo, Viterbi, or Low Density Parity Check (LDPC) encoder and decoder functionality. Modulation and demodulation and encoder and decoder functionality are not limited to these examples and may include other suitable functionality in other examples. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry (e.g., the application circuitry 405, 505 shown in FIGS. 2 and 3) for generation and processing of the baseband signals and for controlling operations of the RF circuitry 606. The baseband circuitry 610 may handle various radio control functions.

The aforementioned circuitry and control logic of the baseband circuitry 610 may include one or more single or multi-core processors. For example, the one or more processors may include a 3G baseband processor 604A, a 4G or LTE baseband processor 604B, a 5G or NR baseband processor 604C, or some other baseband processor(s) 604D for other existing generations, generations in development or to be developed in the future (e.g., sixth generation (6G)). In some examples, some or all of the functionality of baseband processors 604A-D may be included in modules stored in the memory 604G and executed using a Central Processing Unit (CPU) 604E. In some examples, some or all of the functionality of baseband processors 604A-D may be provided as hardware accelerators (e.g., FPGAs or ASICs) loaded with the appropriate bit streams or logic blocks stored in respective memory cells. In some examples, the memory 604G may store program code of a real-time OS (RTOS) which, when executed by the CPU 604E (or other baseband processor), is to cause the CPU 604E (or other baseband processor) to manage resources of the baseband circuitry 610, schedule tasks, or carry out other operations. Examples of the RTOS may include Operating System Embedded (OSE)™ provided by Enea®, Nucleus RIOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 610 includes one or more audio digital signal processor(s) (DSP) 604F. The audio DSP(s) 604F include elements for compression and decompression and echo cancellation and may include other suitable processing elements in some examples.

In some examples, each of the processors 604A-604E include respective memory interfaces to send and receive data to and from the memory 604G. The baseband circuitry 610 may further include one or more interfaces to communicatively couple to other circuitries or devices, such as an interface to send and receive data to and from memory external to the baseband circuitry 610; an application circuitry interface to send and receive data to and from the application circuitry 405, 505 of FIGS. 2 and 3); an RF circuitry interface to send and receive data to and from RF circuitry 606 of FIG. 4; a wireless hardware connectivity interface to send and receive data to and from one or more wireless hardware elements (e.g., Near Field Communication (NFC) components, Bluetooth®/Bluetooth® Low Energy components, Wi-Fi® components, and/or the like); and a power management interface to send and receive power or control signals to and from the PMIC 525.

In some examples (which may be combined with the above described examples), the baseband circuitry 610 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems may include a bus system, point-to-point connections, network-on-chip (NOC) structures, or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, among other components. In some examples, the baseband circuitry 610 may include protocol processing circuitry with one or more instances of control circuitry (not shown) to provide control functions for the digital baseband circuitry or radio frequency circuitry (e.g., the radio front end modules 615).

Although not shown in FIG. 4, in some examples, the baseband circuitry 610 includes individual processing device(s) to operate one or more wireless communication protocols (e.g., a "multi-protocol baseband processor" or "protocol processing circuitry") and individual processing device(s) to implement PHY layer functions. In some examples, the PHY layer functions include the aforementioned radio control functions. In some examples, the protocol processing circuitry operates or implements various protocol layers or entities of one or more wireless communication protocols. For example, the protocol processing circuitry may operate LTE protocol entities or 5G NR protocol entities, or both, when the baseband circuitry 610 or RF circuitry 606, or both, are part of mmWave communication circuitry or some other suitable cellular communication circuitry. In this example, the protocol processing circuitry can operate MAC, RLC, PDCP, SDAP, RRC, and NAS functions. In some examples, the protocol processing circuitry may operate one or more IEEE-based protocols when the baseband circuitry 610 or RF circuitry 606, or both, are part of a Wi-Fi communication system. In this example, the protocol processing circuitry can operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In some examples, the components of the baseband circuitry 610 may be suitably combined in a single chip or chipset, or disposed on a same circuit board. In some examples, some or all of the constituent components of the baseband circuitry 610 and RF circuitry 606 may be implemented together such as, for example, a system on a chip (SoC) or System-in-Package (SiP). In some examples, some or all of the constituent components of the baseband circuitry 610 may be implemented as a separate SoC that is communicatively coupled with and RF circuitry 606 (or multiple instances of RF circuitry 606). In some examples, some or all of the constituent components of the baseband circuitry 610 and the application circuitry 405, 505 may be implemented together as individual SoCs mounted to a same circuit board (e.g., a "multi-chip package").

In some examples, the baseband circuitry 610 may provide for communication compatible with one or more radio technologies. For example, the baseband circuitry 610 may support communication with an E-UTRAN or other WMAN, a WLAN, or a WPAN. Examples in which the baseband circuitry 610 is configured to support radio communications of more than one wireless protocol may be referred to as multi-mode baseband circuitry.

The RF circuitry 606 may enable communication with wireless networks using modulated electromagnetic radiation through a non-solid medium. In some examples, the RF circuitry 606 may include switches, filters, or amplifiers, among other components, to facilitate the communication with the wireless network. The RF circuitry 606 may include a receive signal path, which may include circuitry to down-convert RF signals received from the FEM circuitry 608 and provide baseband signals to the baseband circuitry 610. The RF circuitry 606 may also include a transmit signal path, which may include circuitry to up-convert baseband signals provided by the baseband circuitry 610 and provide RF output signals to the FEM circuitry 608 for transmission.

The receive signal path of the RF circuitry 606 includes mixer circuitry 606*a*, amplifier circuitry 606*b* and filter circuitry 606*c*. In some examples, the transmit signal path of the RF circuitry 606 may include filter circuitry 606*c* and mixer circuitry 606*a*. The RF circuitry 606 also includes synthesizer circuitry 606*d* for synthesizing a frequency for use by the mixer circuitry 606*a* of the receive signal path and the transmit signal path. In some examples, the mixer circuitry 606*a* of the receive signal path may be configured to down-convert RF signals received from the FEM circuitry 608 based on the synthesized frequency provided by synthesizer circuitry 606*d*. The amplifier circuitry 606*b* may be configured to amplify the down-converted signals and the filter circuitry 606*c* may be a low-pass filter (LPF) or band-pass filter (BPF) configured to remove unwanted signals from the down-converted signals to generate output baseband signals. Output baseband signals may be provided to the baseband circuitry 610 for further processing. In some examples, the output baseband signals may be zero-frequency baseband signals, although this is not a requirement. In some examples, the mixer circuitry 606*a* of the receive signal path may comprise passive mixers.

In some examples, the mixer circuitry 606*a* of the transmit signal path may be configured to up-convert input baseband signals based on the synthesized frequency provided by the synthesizer circuitry 606*d* to generate RF output signals for the FEIN circuitry 608. The baseband signals may be provided by the baseband circuitry 610 and may be filtered by filter circuitry 606*c*.

In some examples, the mixer circuitry 606*a* of the receive signal path and the mixer circuitry 606*a* of the transmit signal path may include two or more mixers and may be arranged for quadrature downconversion and upconversion, respectively. In some examples, the mixer circuitry 606*a* of the receive signal path and the mixer circuitry 606*a* of the transmit signal path may include two or more mixers and may be arranged for image rejection (e.g., Hartley image rejection). In some examples, the mixer circuitry 606*a* of the receive signal path and the mixer circuitry 606*a* of the transmit signal path may be arranged for direct downconversion and direct upconversion, respectively. In some examples, the mixer circuitry 606*a* of the receive signal path and the mixer circuitry 606*a* of the transmit signal path may be configured for super-heterodyne operation.

In some examples, the output baseband signals and the input baseband signals may be analog baseband signals. In some examples, the output baseband signals and the input baseband signals may be digital baseband signals, and the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode examples, a separate radio IC circuitry may be provided for processing signals for each spectrum, although the techniques described here are not limited in this respect.

In some examples, the synthesizer circuitry 606*d* may be a fractional-N synthesizer or a fractional N/N+1 synthesizer, although other types of frequency synthesizers may used. For example, synthesizer circuitry 606*d* may be a delta-sigma synthesizer, a frequency multiplier, or a synthesizer comprising a phase-locked loop with a frequency divider.

The synthesizer circuitry 606*d* may be configured to synthesize an output frequency for use by the mixer circuitry 606*a* of the RF circuitry 606 based on a frequency input and a divider control input. In some examples, the synthesizer circuitry 606*d* may be a fractional N/N+1 synthesizer.

In some examples, frequency input may be provided by a voltage controlled oscillator (VCO), although that is not a requirement. Divider control input may be provided by either the baseband circuitry 610 or the application circuitry 405/505 depending on the desired output frequency. In some examples, a divider control input (e.g., N) may be determined from a look-up table based on a channel indicated by the application circuitry 405, 505.

The synthesizer circuitry 606*d* of the RF circuitry 606 may include a divider, a delay-locked loop (DLL), a multiplexer and a phase accumulator. In some examples, the divider may be a dual modulus divider (DMD) and the phase accumulator may be a digital phase accumulator (DPA). In some examples, the DMD may be configured to divide the input signal by either N or N/N+1 (e.g., based on a carry out) to provide a fractional division ratio. In some examples, the DLL may include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

In some examples, synthesizer circuitry 606d may be configured to generate a carrier frequency as the output frequency, while in other examples, the output frequency may be a multiple of the carrier frequency (e.g., twice the carrier frequency, four times the carrier frequency) used in conjunction with quadrature generator and divider circuitry to generate multiple signals at the carrier frequency with multiple different phases with respect to each other. In some examples, the output frequency may be a LO frequency (fLO). In some examples, the RF circuitry 606 may include an IQ or polar converter.

The FEM circuitry 608 may include a receive signal path, which may include circuitry configured to operate on RF signals received from antenna array 611, amplify the received signals and provide the amplified versions of the received signals to the RF circuitry 606 for further processing. The FEM circuitry 608 may also include a transmit signal path, which may include circuitry configured to amplify signals for transmission provided by the RF circuitry 606 for transmission by one or more of antenna elements of antenna array 611. The amplification through transmit or receive signal paths may be done solely in the RF circuitry 606, solely in the FEM circuitry 608, or in both the RF circuitry 606 and the FEM circuitry 608.

In some examples, the FEM circuitry 608 may include a TX/RX switch to switch between transmit mode and receive mode operation. The FEM circuitry 608 may include a receive signal path and a transmit signal path. The receive signal path of the FEM circuitry 608 may include an LINA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted using the antenna elements of the antenna array 611 including one or more antenna elements (not shown). The antenna elements may be omnidirectional, directional, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed as a patch of metal foil (e.g., a patch antenna) in a variety of shapes, and may be coupled with the RI circuitry 606 and/or FEET circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may be used execute Layer 3, Layer 2, or Layer 1 functionality, while processors of the application circuitry 405, 505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a. PITY layer of a LEE/RAN node, described in further detail below.

FIG. 5 illustrates various protocol functions that may be implemented in a wireless communication device. In particular, FIG. 5 includes an arrangement 800 showing interconnections between various protocol layers/entities. The following description of FIG. 5 is provided for various protocol layers and entities that operate in conjunction with the 5G NR system standards and the LTE system standards, but some or all of the aspects of FIG. 5 may be applicable to other wireless communication network systems as well.

The protocol layers of arrangement 800 may include one or more of PRY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 5) that may provide communication between two or more protocol layers.

The PRY 810 may transmit and receive physical layer signals 805 that may be received from or transmitted to one or more other communication devices. The physical layer signals 805 may include one or more physical channels, such as those discussed herein. The PRY 810 may further perform link adaptation or adaptive modulation and coding (AMC), power control, cell search (e.g., for initial synchronization and handover purposes), and other measurements used by higher layers, such as the RRC 855. The PRY 810 may still further perform error detection on the transport channels, forward error correction (FEC) coding and decoding of the transport channels, modulation and demodulation of physical channels, interleaving, rate matching, mapping onto physical channels, and MEMO antenna processing. In some examples, an instance of PHY 810 may process requests from and provide indications to an instance of MAC 820 using one or more PHY-SAP 815. In some examples, requests and indications communicated using PHY-SAP 815 may comprise one or more transport channels.

Instance(s) of MAC 820 may process requests from, and provide indications to, an instance of RLC 830 using one or more MAC-SAPS 825. These requests and indications communicated using the MAC-SAP 825 may include one or more logical channels. The MAC 820 may perform mapping between the logical channels and transport channels, multiplexing of MAC service data units (SDUs) from one or more logical channels onto transport blocks (TBs) to be delivered to PHY 810 using the transport channels, demultiplexing MAC SDUs to one or more logical channels from TBs delivered from the PHY 810 using transport channels, multiplexing MAC SDUs onto TBs, scheduling information reporting, error correction through HARQ, and logical channel prioritization.

Instance(s) of RLC 830 may process requests from and provide indications to an instance of PDCP 840 using one or more radio link control service access points (RLC-SAP) 835. These requests and indications communicated using RLC-SAP 835 may include one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARCS) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 or instance(s) of SDAP 847, or both, using one or more packet data convergence protocol service access points (PDCP-SAP) 845. These requests and indications communicated using PDCP-SAP 845 may include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 847 may process requests from and provide indications to one or more higher layer protocol entities using one or more SDAP-SAP 849. These requests and indications communicated using SDAP-SAP 849 may include one or more QoS flows. The SDAP 847 may map QoS flows to data radio bearers (DRBs), and vice versa, and may also mark QoS flow identifiers (QRs) in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In some examples, the SDAP 847 may only be used in NR implementations and may not be used in LTE implementations.

The RRC 855 may configure, using one or more management service access points (M-SAP), aspects of one or more protocol layers, which may include one or more instances of PHY 810, MAC 820, RLC 830, PDCP 840 and SDAP 847. In some examples, an instance of RRC 855 may process requests from and provide indications to one or more NAS entities 857 using one or more RRC-SAPs 856. The main services and functions of the RRC 855 may include broadcast of system information (e.g., included in master information blocks (MIBs) or system information blocks (SIBS) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBS may comprise one or more information elements, which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

In some examples, one or more protocol entities of arrangement 800 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In some examples, one or more protocol entities that may be implemented in one or more of UE 101, gNB 111, AMF 321, among others, may communicate with a respective peer protocol entity that may be implemented in or on another device using the services of respective lower layer protocol entities to perform such communication. In some examples, a gNB-CU of the gNB 111.1 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In some examples, a control plane protocol stack may include, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In some examples, such as NR implementations, the AP 863 may be an NG application protocol layer (NEAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise elementary procedures (EPs). An NG-AP EP may be a unit of interaction between the NG-RAN node 111 and the AMF 3211. The NG-AP 863 services may include two groups: UE-associated services (e.g., services related to a UE 101) and non-UE-associated services (e.g., services related to the whole NG interface instance between the NG-RAN node 111 and AMF 321). These services may include functions such as, but not limited to: a paging function for the sending of paging requests to NG-RAN nodes 111 involved in a particular paging area; a UE context management function for al lowing the AMF 321 to establish, modify, or release a UE context in the AMF 321 and the NG-RAN node 111; a mobility function for TEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or S2-AP) 863 for the X2 interface 112 that is defined between two or more E-UTRAN nodes 111.

The S1 Application Protocol layer (S1-AP) 863 may support the functions of the S1 interface, and similar to the NG AP discussed previously, the S1-AP may include S1-AP EPs. An S1-AP EP may be a unit of interaction between the E-UTRAN node 111 and an MME 221 within a LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may include X2AP basic mobility procedures and X2AP global procedures. The X2AP basic mobility procedures may include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based in part on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 may include L2 and L1 layer communication links (e.g., wired or wireless) with the MME/AMF to exchange information.

In some examples, a user plane protocol stack may include, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and may include a user datagram protocol (UDP) and IP security layer (LTDRIP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data using a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data using a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 5, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some examples, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 6:
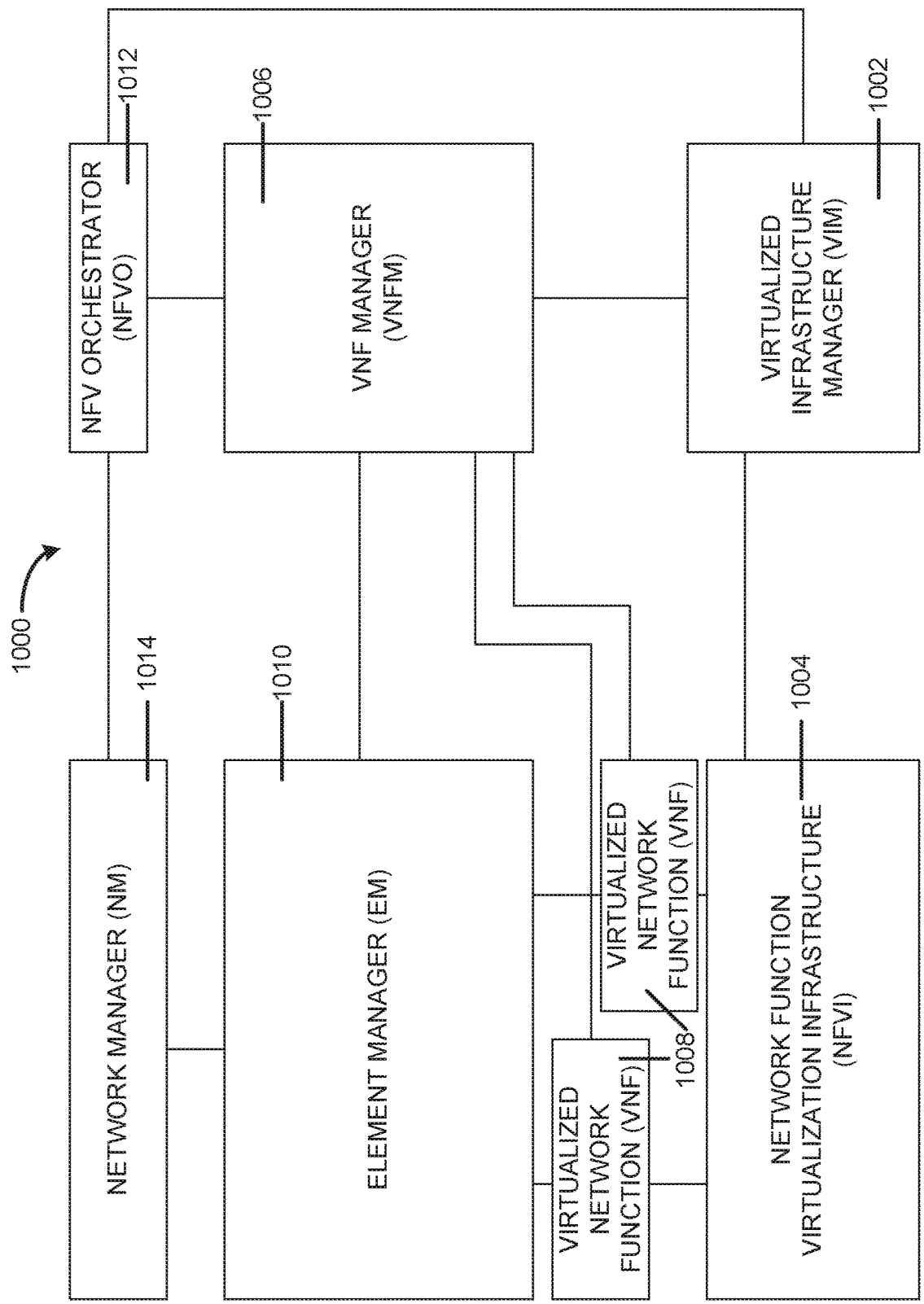
FIG. 6 illustrates an example system to support network function virtualization.

FIG. 6 is a block diagram illustrating components of a system 1000 to support NFV. The system 1000 is illustrated as including a virtualized infrastructure manager (VIM) 1002, a network function virtualization infrastructure (NFVI) 1004, a virtualized network function manager (VNFM) 1006, virtualized network functions (VNTs) 1008, an element manager (EM) 1010, a network function virtualization orchestrator (NFVO) 1012, and a network manager (NM) 1014.

The VIM 1002 manages the resources of the NFVI 1004. The NFVI 1004 can include physical or virtual resources and applications (including hypervisors) used to execute the system 1000. The VIM 1002 may manage the life cycle of virtual resources with the NFVI 1004 (e.g., creation, maintenance, and tear down of VMs associated with one or more physical resources), track VM instances, track performance, fault and security of VM instances and associated physical resources, and expose VM instances and associated physical resources to other management systems.

The VNFM 1006 may manage the VNFs 1008. The VNFs 1008 may be used to execute, for example, EPC components and functions. The VNFM 1006 may manage the life cycle of the VNFs 1008 and track performance, fault and security of the virtual aspects of VNFs 1008. The EM 1010 may track the performance, fault and security of the functional aspects of VNFs 1008. The tracking data from the VNFM 1006 and the EM 1010 may comprise, for example, PM data used by the VIM 1002 or the NFVI 1004. Both the VNFM 1006 and the EM 1010 can scale up or down the quantity of VNFs of the system 1000.

The NFVO 1012 may coordinate, authorize, release and engage resources of the NFVI 1004 in order to provide the requested service (e.g., to execute an EPC function, component, or slice). The NM 1014 may provide a package of end-user functions with the responsibility for the management of a network, which may include network elements with VNFs, non-virtualized network functions, or both (management of the VNFs may occur using the EM 1010).

Figure 7:
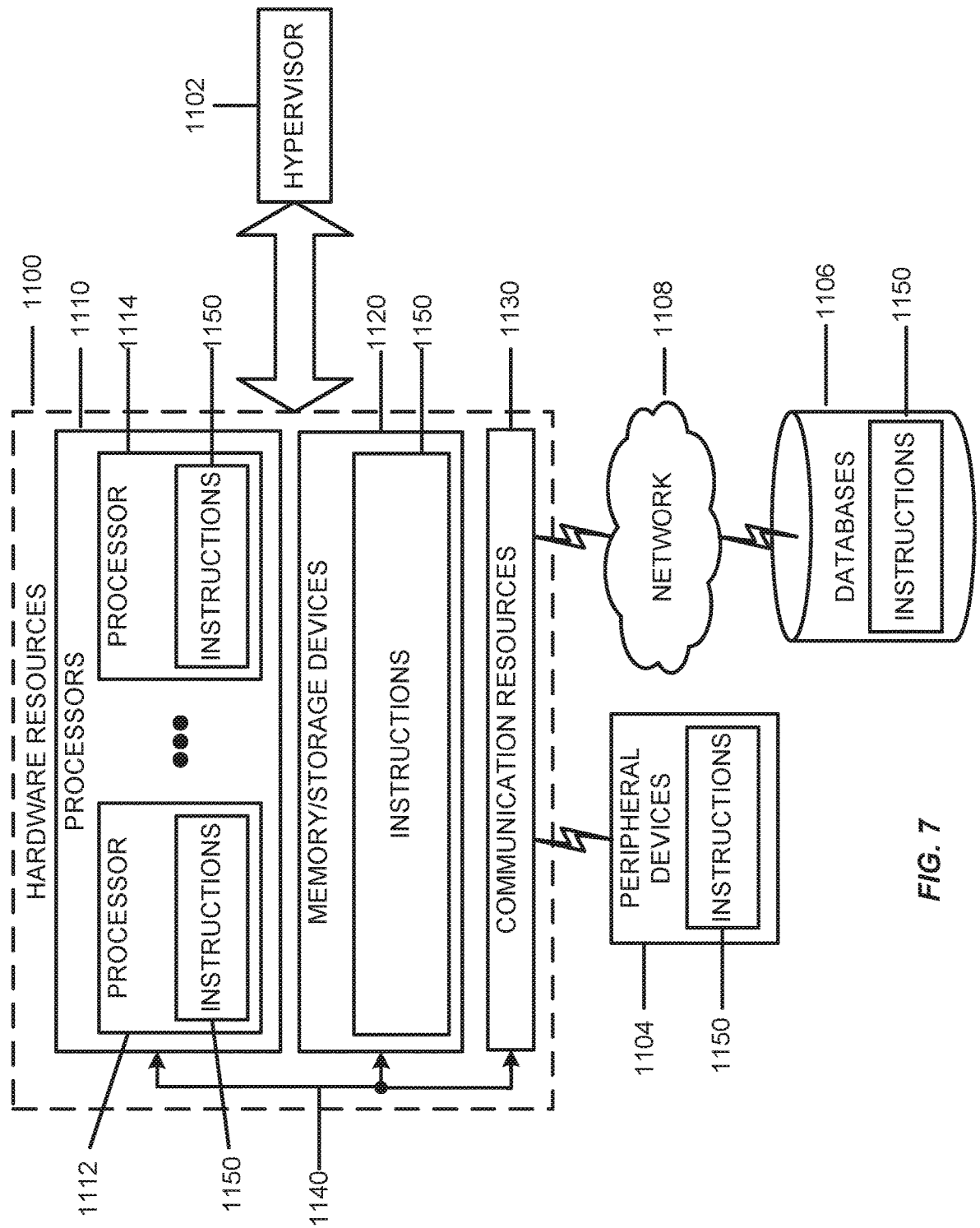
FIG. 7 illustrates an example computer system.

FIG. 7 is a block diagram illustrating components for reading instructions from a machine-readable or computer-readable medium (e.g., a non-transitory machine-readable storage medium) and performing any one or more of the techniques described herein. Specifically, FIG. 7 shows a diagrammatic representation of hardware resources 1100 including one or more processors (or processor cores) 1110, one or more memory or storage devices 1120, and one or more communication resources 1130, each of which may be communicatively coupled using a bus 1140. For implementations where node virtualization (e.g., NFV) is utilized, a hypervisor 1102 may be executed to provide an execution environment for one or more network slices or sub-slices to utilize the hardware resources 1100.

The processors 1110 may include a processor 1112 and a processor 1114. The processor(s) 1110 may be, for example, a central processing unit (CPU), a reduced instruction set computing (RISC) processor, a complex instruction set computing (CNC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, or solid-state storage, or combinations of them, among others.

The communication resources 1130 may include interconnection or network interface components or other suitable devices to communicate with one or more peripheral devices 1104 or one or more databases 1106 using a network 1108. For example, the communication resources 1130 may include wired communication components (e.g., for coupling using USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

Figure 8:
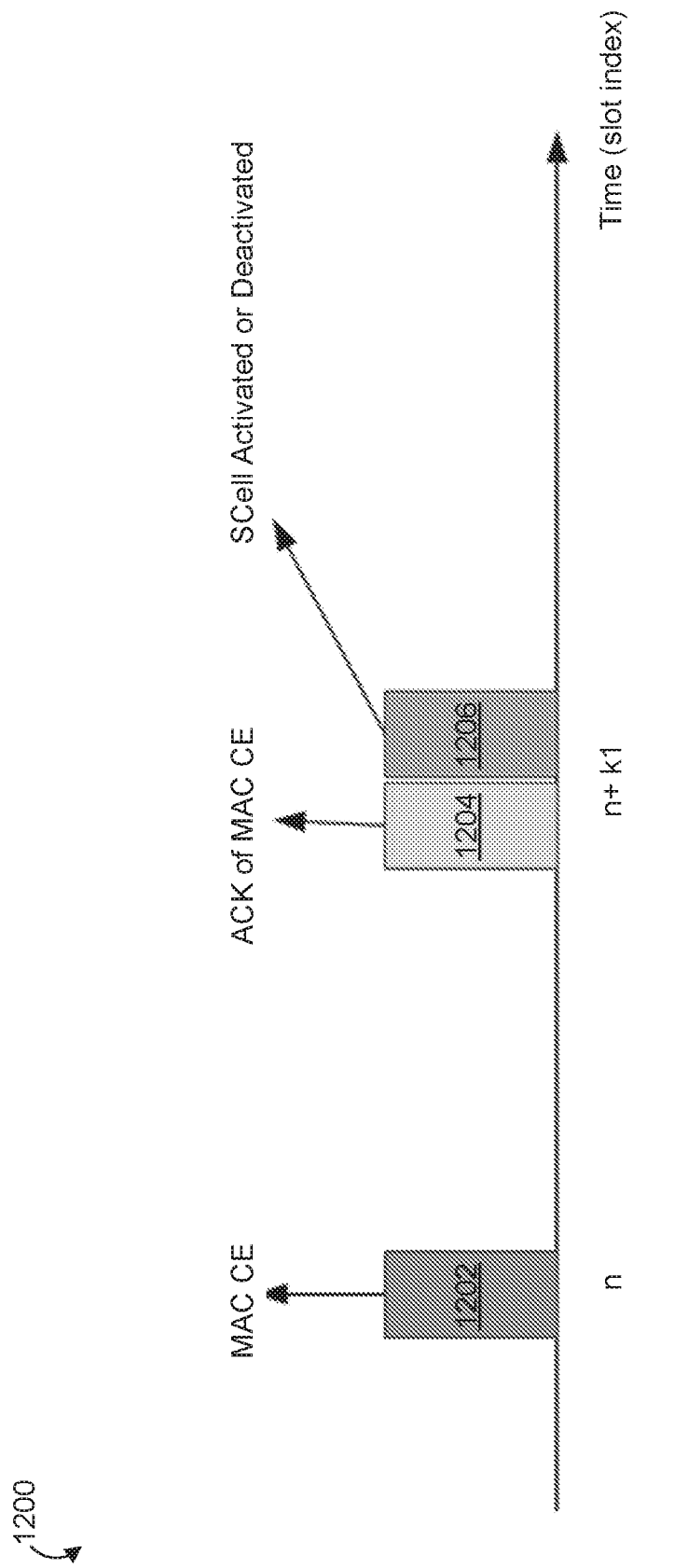
FIG. 8 shows an illustration of an example of a timing for fast SCell activation and/or deactivation with a MAC CE.

FIG. 8 shows an illustration of an example of a timing for fast SCell activation and/or deactivation with a MAC CE. Generally, a UE uses a MAC CE for SCell activation or deactivation when the UE is configured with carrier aggregation in order to activate or deactivate SCells that are configured for use by the UE. In this example, a new MAC GE can be used for fast SCell activation/deactivation using slot-level timing. The MAC CE is configured to perform fast SCell activation/deactivation when an activation delay time depends on the numerology of a serving cell activating the SCell. In other words, the delay time depends on the sub-carrier spacing in the NR as a function of $f=15 \text{ kHz} \ast 2^n$, where n is the numerology sub-carrier spacing step. The numerology thus includes a subcarrier spacing and/or symbol length used by the serving cell. The delay can be less than 5 ms, down to several timing slots, depending on the delay of the HARQ-ACC response delay. The MAC CE can be signaled by a newly defined logical channel ID. In the timing diagram 1200, a UE configures a MAC CE 1202 for fast SCell activation/deactivation at timing slot n. At slot n+k1, there is an acknowledgement 1204 of the MAC CE 1202 and the SCell is deactivated or activated 1206. The IX commences transmission of a CSI report at slot n+k1+1. The UE also monitors PDCCH reception. Generally, k1 stands for the PDSCH to HARQ-ACK response delay signaled in DCI.

For operating using the timing for fast SCell activation or deactivation, a UE performs the following steps. The UE receives, from a serving cell, a MAC CE including a plurality of bits, wherein individual bits of the plurality of bits each indicate whether respective SCells are activated or deactivated. Based on the numerology of the serving cell, the UE determines an activation delay time for one or more activated SCells indicated by the plurality of bits of the MAC CE. The UE then communicates using the activated SCells based on the determined activation delay time. In some implementations, the MAC CE includes a MAC protocol data unit (PDU) subheader with a logical channel ID to indicate a size of the MAC CE. Several possible sizes of the MAC CE are described in relation to FIGS. 9-10.

As previously described, the delay time is based on a numerology of the serving cell. The exact delay time can be indicated by the MAC CE. For example, the MAC CE can include an indicator to indicate that the activation delay time is to be determined based on the numerology of the serving cell. In some implementations, the indicator is a single bit. In some implementations, the MAC CE is one of many MAC CEs. The timing indicator is one of many indicators and has a particular value indicating the activation delay time. Here, another MAC CE with a different indicator can indicate that a different activation delay time is to be used for one or more activated SCells indicated by the additional MAC CE. As subsequently described in relation to FIGS. 11-12, the second activation delay time can be determined according to a typical 3GPP Release 15 procedure, while the first delay time is a fast activation/deactivation delay time. In some implementations, both the first and second MAC CEs use the fast SCell activation or deactivation process previously described.

Figure 9:
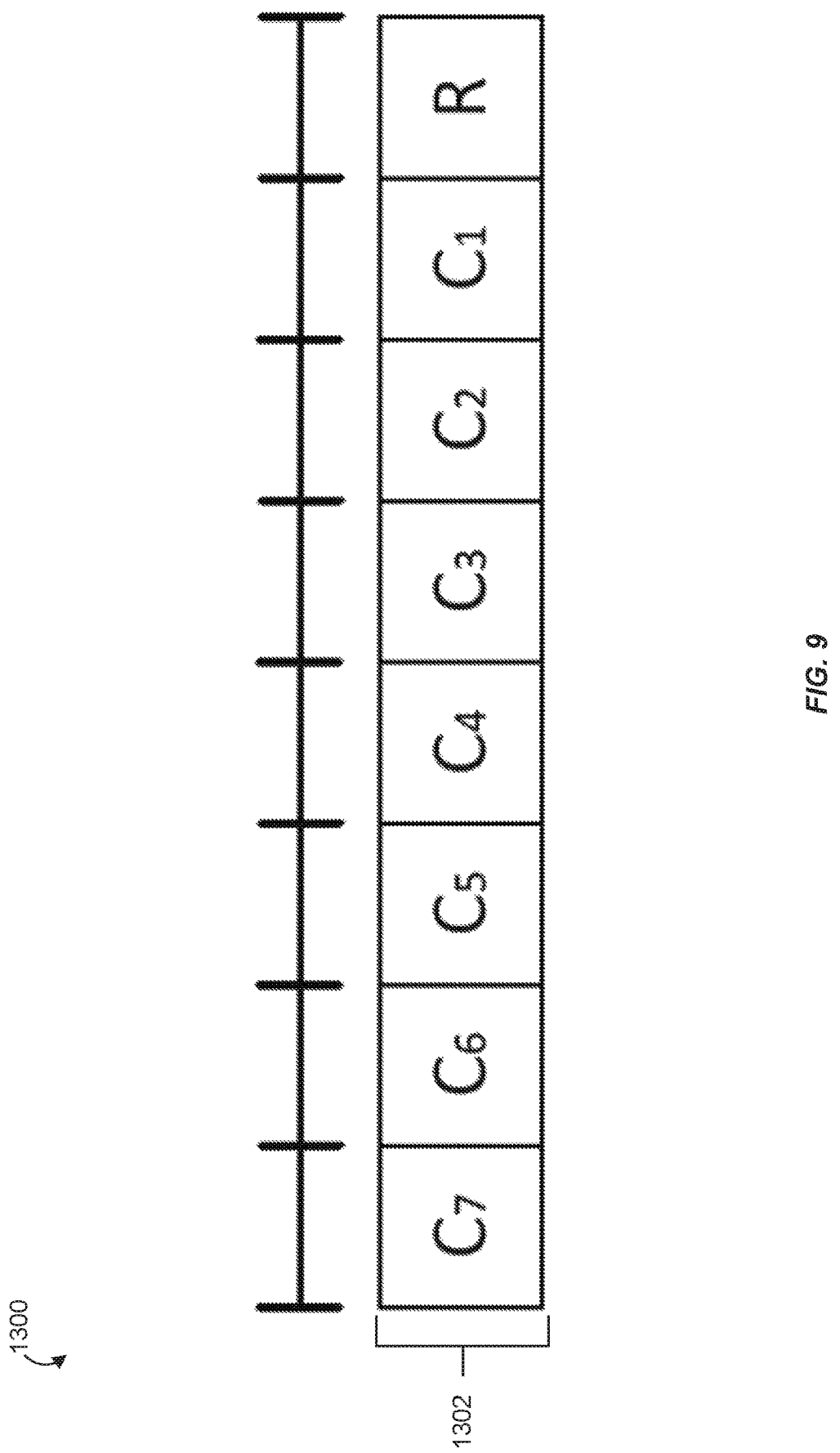
FIGS. 9-10 show examples of fast SCell MAC CEs for the example timing of FIG. 8.
Figure 10:
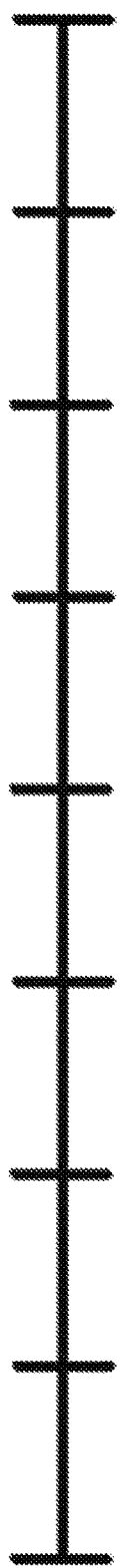

FIGS. 9-10 show examples of fast SCell MAC CEs. FIG. 9 shows an illustration of an example fast SCell Activation/Deactivation MAC GE 1300 with one octet 1302. FIG. 10 shows an illustration of an example fast SC ell Activation/Deactivation MAC CE 1350 with four octets including octet 1352, octet 1354, octet 1356, and octet 1358. Generally, the fast SCell activation/deactivation MAC CEs 1300 and 1350 for each of one and four octet(s), respectively, can be identified by a MAC PDU subheaders with different LCIDs. The subheaders have fixed size and consist of one and four octets containing seven C-fields and one R-field.

The fields of fast SCell activation/deactivation MAC CEs 1300 and 1350 of FIGS. 9 and 10 are defined as follows. Each of the octets 1302, 1352, 1354, 1356, and 1358 includes at least one C-field titled Ci, where I is an index value. If there is a SCell configured for the MAC entity with SCellIndex i as specified in 3GPP TS 38,331, NR; Radio Resource Control (RRC) protocol specification (Release 15), version 15.5.1, section 6.3.2, published in May 2019, incorporated herein in entirety by reference. This field indicates the activation/deactivation status of the SCell with SCellIndex i. Else, the MAC entity ignores the Ci field. The Ci field is set to a value of "1" to indicate that the SCell with SCellIndex i is being activated. The Ci field is set to "0" to indicate that the SCell with SCellIndex i is being deactivated. The field denoted R is a reserved bit and is set to "0."

Figure 11:
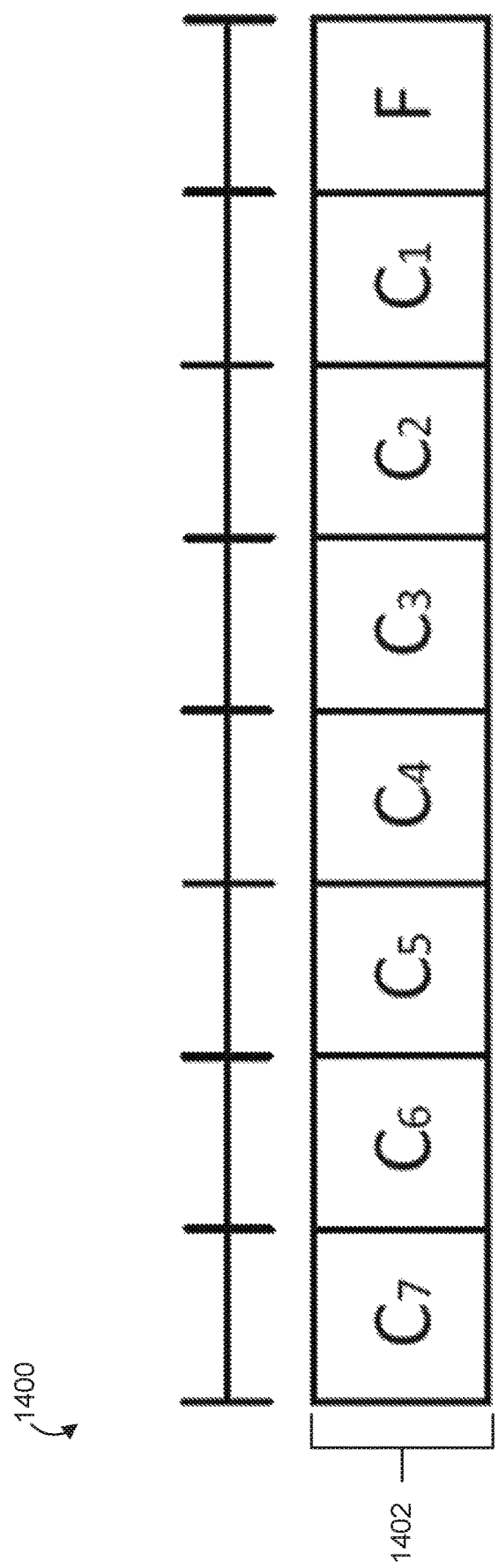
Figure 12:
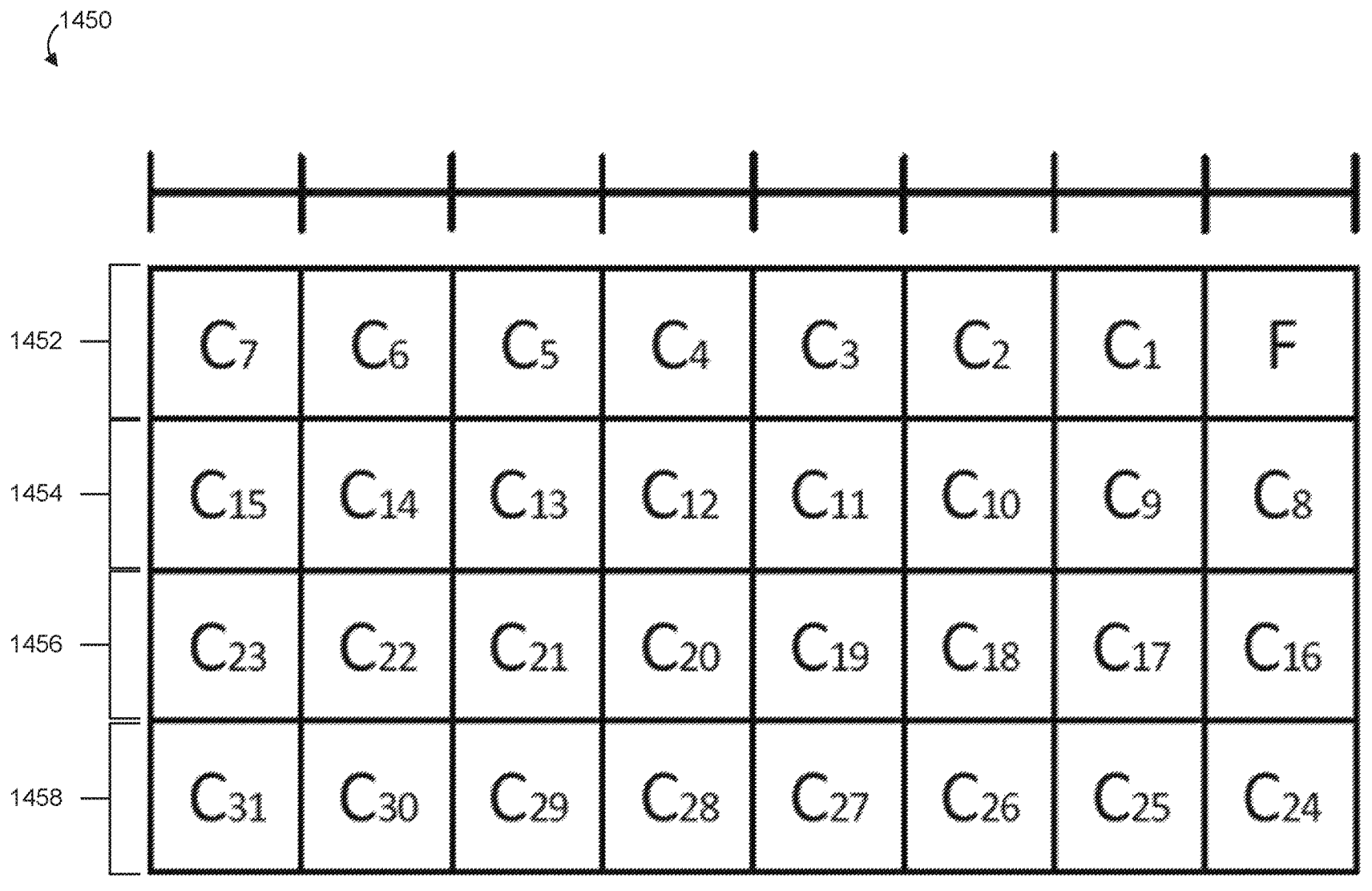

FIGS. 11 and 12 show illustrations of example enhanced MAC CEs for secondary cell activation/deactivation. FIG. 11 shows an illustration of an example enhanced MAC CE 1400 including octet 1402. FIG. 12 shows an illustration of an example enhanced MAC CE 1450 with four octets including octet 1452, octet 1454, octet 1456, and octet 1458. MAC CEs 1400 and 1450 are based on Rel-15 MAC CEs of 3GPP TS 38.321.

The SCell activation/deactivation MAC CEs 1400, 1450 are further enhanced to support both a typical SCell activation/deactivation procedure with SCell activation/deactivation delay and fast SCell activation/deactivation delay, as described in relation to FIG. 8. As such, the enhanced MAC CEs are identified by the LCIDs as in Rel-15 MAC CE of 3GPP TS 38.321. Specifically, enhanced fast SCell activation/deactivation MAC CEs 1400, 1450 of one and four octet(s) have fixed size. The MAC CE 1400 includes one octet 1402, and the MAC CE 1450 includes four octets 1452, 1454, 1456, and 1458, each including seven C-fields and one F-field.

The fields of the enhanced SCell activation/deactivation MAC CEs 1400 and 1450 are defined as follows. For each of the C-fields there is a SCell configured for the MAC entity with SCellIndex i, as specified under radio resource control elements 3GPP TS 38.331 version 15.5.1 section 6.3.2. This field indicates the activation/deactivation status of the SCell with SCellIndex i. Else, the MAC entity ignores the $C_i$ field. The $C_i$ field is set to "1" to indicate that the SCell with SCellIndex i is being activated. The $C_i$ field is set to "0" to indicate that the SCell with SCellIndex i is being deactivated. Fields marked F represent a flag bit. If the value of field F is set to "0," the typical Rel-15 SCell activation/deactivation timing procedure, described in 3GPP TS 38.133, version 15.4.0, published in April 2019, is applied. If the field is set to "1", slot level based fast SCell activation/deactivation timing procedure described in relation to FIG. 8 is applied.

Figure 13:
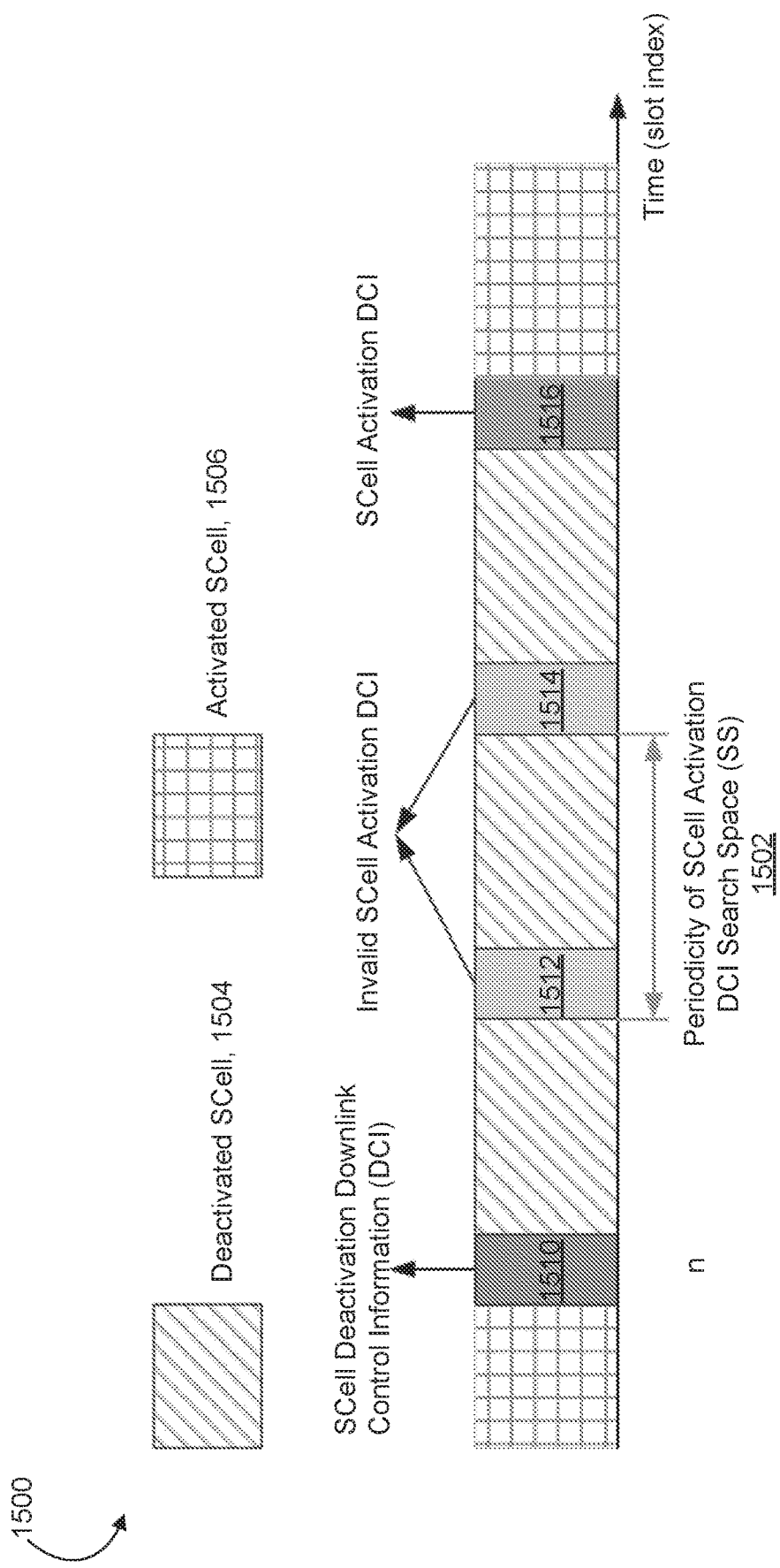
FIG. 13 shows an illustration of a timing diagram for downlink control information (DCI)-based SCell activation/deactivation operations.

FIG. 13 shows an illustration of a timing diagram 1500 for downlink control information (DCI)-based SCell activation/deactivation operations. As shown in diagram 1500, a newly defined Del field or redefined Rel-15 DCI field indicates the SCell activation/deactivation command. When a UE receives a SCell deactivation command at slot n (labeled 1510), the UE can immediately enter the SCell deactivation mode at slot n+1 (labeled 1512). When remaining SCell deactivation state, UE can monitor the configured SCell activation DCI to determine whether to activate the SCell or remain in the deactivated state. The periodicity of configured SCell activation DCI search space (SS) 1502 can be set to a maximum allowed latency value for a corresponding service with the most stringent latency requirement of the available services, ending at time slot 1514. The SCell activation DCI is then initiated at the next time slot 1516.

Generally, the SCell deactivation DCI format can also signal the characteristics of the SCell deactivated state 1504 to control the UE operation during the deactivated state of the SCell. Specifically, the following operations can signaled by SCell deactivation DCI format. A CSI-report indicator specifies whether the UE can still perform CSI reporting for the deactivated SCell. A Physical Uplink Control Channel (PUCCH) transmission indicator specifies whether any PUCCH resources, if configured, are still available for PUCCH transmission. A sounding reference signal (SRS) transmission indicator specifies whether the UE can still transmit a configured SRS in the deactivated SCell. The above signaling in SCell deactivation DCI enables the UE to achieve a different trade-off between power consumption, service latency, and spectrum efficiency when being activated again.

The UE is thus configured for communicating on a SCell with fast activation or deactivation by receiving DCI indicating deactivation of a SCell for a wireless cellular network. The DCI includes at least one of the following. The DCI can include a CSI report indicator to indicate whether the UE is to perform CSI reporting for the deactivated SCell. The DCI includes a physical uplink control channel (PUCCH) transmission indicator to indicate whether PUCCH resources on the SCell, if configured, are still available for PUCCH transmission. The DCI includes a SRS transmission indicator to indicate whether the LTE is to transmit configured SRS in the deactivated SCell. The UE communicates on the wireless cellular network based on the DCI.

The UE can be configured to enter a SCell deactivation mode based on the DCI. When in the SCell deactivation mode, the UE monitors for a SCell activation DCI to indicate that the SCell is activated. In some implementations, the UE is to enter the SCell deactivation mode in a next subframe after a subframe in which the DCI is received, as previously described. The UE receives configuration information for monitoring for the SCell activation DCI. The SCell activation DCI is to indicate whether the SCell is activated or whether the SCell is to remain in the deactivated state. The UE receives the SCell activation DCI and activating the SCell based on the SCell activation DCI. In some implementations, the DCI includes deactivation information for multiple SCells.

Figure 14:
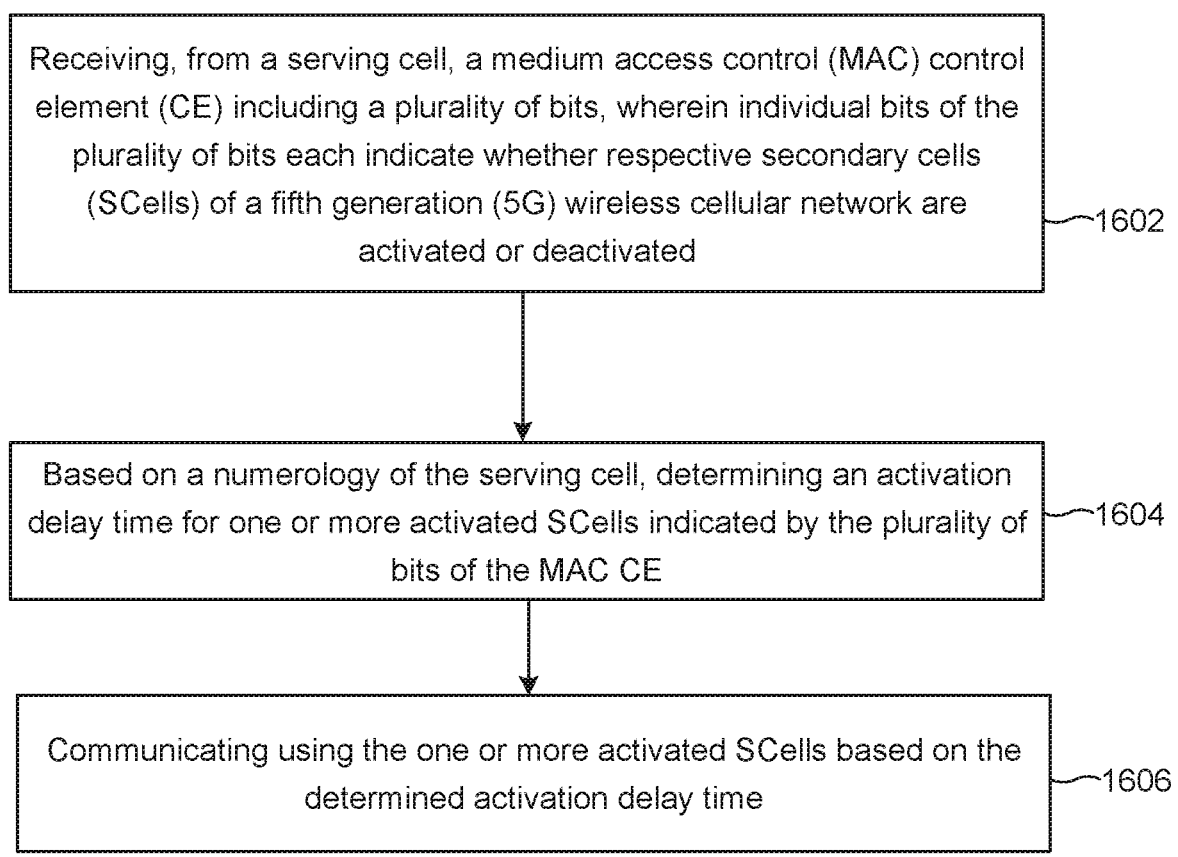
FIGS. 14 and 15 show example processes for fast secondary cell activation and deactivation.
Figure 15:
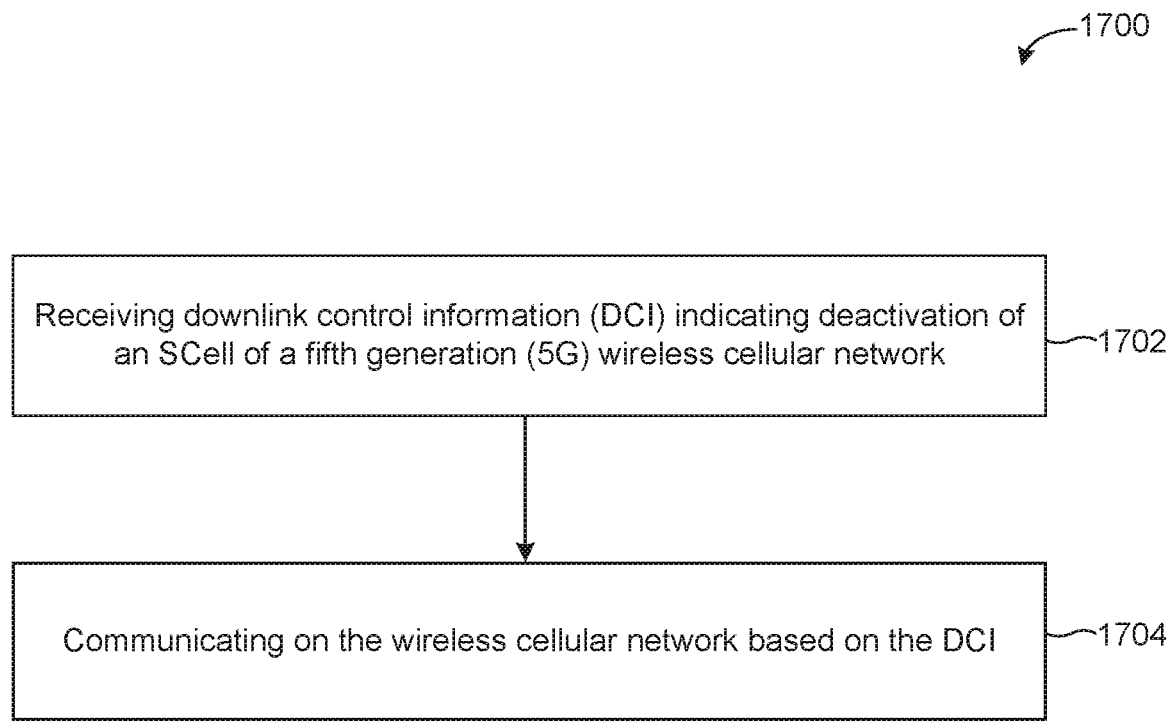

FIGS. 14 and 15 show example processes for fast secondary cell activation and deactivation. FIG. 14 shows process 1600 for configuring a UE by a MAC CE for fast secondary cell activation/deactivation at a slot level. This can reduce the delay for activation or deactivation to less than 5 ms or to several timing slots at maximum, depending on the numerology of the serving cell.

The process 1600 is for communicating, by user equipment (UE), on a secondary cell (SCell) with fast activation or deactivation. The process 1600 includes receiving (1602), from a serving cell, a medium access control (MAC) control element (CE) including a plurality of bits, wherein individual bits of the plurality of bits each indicate whether respective secondary cells (SCells) of a fifth generation (5G) wireless cellular network are activated or deactivated. The process includes, based on a numerology of the serving cell, determining (1604) an activation delay time for one or more activated SCells indicated by the plurality of bits of the MAC CE. The process 1600 includes communicating (1606) using the one or more activated SCells based on the determined activation delay time.

FIG. 15 shows process 1700 for configuring a UE by a MAC CE for fast secondary cell activation/deactivation at a slot level. This can reduce the delay for activation or deactivation to less than 5 ms or to several timing slots at maximum, depending on the numerology of the serving cell. The process 1700 includes receiving (1702) downlink control information (DCI) indicating deactivation of a SCell of a fifth generation (5G) wireless cellular network. The process 1700 includes communicating (1704) on the wireless cellular network based on the DCI. The DCI can include a channel state information (CSI) report indicator to indicate whether the UE is to perform CSI reporting for the deactivated SCell. The DCI can include a PUCCH transmission indicator to indicate whether PUCCH resources on the SCell, if configured, are still available for PUCCH transmission. The DCI can include a SRS transmission indicator to indicate whether the UE is to transmit configured SRS in the deactivated SCell. Generally, the DCI includes one of the above.

In some implementations, the TIE is configured, during process 1700, to enter a SCell deactivation mode based on the DCI, and when in the SCell deactivation mode, monitoring for a SCell activation DCI to indicate that the SCell is activated. The process 1700 can include entering, by the UE, the SCell deactivation mode in a next subframe after a first subframe in which the DCI is received. The process 1700 can include receiving configuration information for monitoring for the SCell activation DCI. In some implementations, the SCell activation DCI indicates whether the SCell is activated or whether the SCell is to remain in the deactivated state. The process 1700 can include receiving the SCell activation DCI, and activating the SCell based on the SCell activation DCI. In some implementations, the DCI includes deactivation information for multiple SCells.

The techniques described herein can be performed by an apparatus that is implemented in or employed by one or more types of network components, user devices, or both. In some implementations, one or more non-transitory computer-readable media comprising instructions to cause an electronic device, upon execution of the instructions by one or more processors of the electronic device, to perform one or more of the described techniques. An apparatus can include one or more processors and one or more computer-readable media comprising instructions that, when executed by the one or more processors, cause the one or more processors to perform one or more of the described techniques.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

The methods described herein can be implemented in circuitry such as one or more of: integrated circuit, logic circuit, a processor (shared, dedicated, or group) and/or memory (shared, dedicated, or group), an AMC, a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), or some combination thereof. Examples of processors can include Apple A-series processors, Intel® Architecture Core™ processors, ARM processors, AMD processors, and Qualcomm processors. Other types of processors are possible. In some implementations, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. Circuitry can also include radio circuitry such as a transmitter, receiver, or a transceiver.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/DC.

The term "Special Cell" refers to the PCell of the MCG or the PSCell of the SCG for DC operation; otherwise, the term "Special Cell" refers to the PCell.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

EXAMPLES

Example 1 may include a new MAC CE can be used for fast SCell activation/deactivation on slot level timing where activation delay time depends on the numerology of the serving cell activating the SCell.

Example 2 may include the new MAC CE in example 1 or some other example herein, wherein the MAC CE can be signaled by a new logical channel ID.

Example 3 may include as illustrated in FIG. 1, upon the reception of the MAC CE for fast SCell activation/deactivation, e.g., at slot n, UE can start to transmit CSI report at slot n+k1+1 as well as monitor PDCCH reception, where k1 stands for the PDSCH to HARQ-ACK response delay signaled in DCI.

Example 4 may include the fast SCell Activation/Deactivation MAC CEs in example 3 or some other example herein, wherein of one and four octet(s) can be identified by a MAC PDU subheaders with different MID.

Example 5 may include the MAC CEs in example 4 or some other example herein, wherein have fixed size and consist of one and four octets containing seven C-fields and one R-field. The fast SCell Activation/Deactivation MAC CE with one and four octets are illustrated in FIGS. 9 and 10, respectively.

Example 6 may include the fields of fast SCell activation/deactivation MAC CEs illustrated in FIGS. 9 and 10 are defined as follows. Ci: If there is a SCell configured for the MAC entity with SCellIndex i as specified in TS 38.331, this field indicates the activation/deactivation status of the SCell with SCellIndex i, else the MAC entity shall ignore the Ci field. The Ci field is set to "1" to indicate that the SCell with SCell Index i shall be activated. The Ci field is set to "0" to indicate that the SCell with SCellIndex i shall be deactivated; R: Reserved bit, set to "0".

Example 7 may include Rel-15 SCell activation/deactivation MAC GE can be further enhanced to support normal SCell activation/deactivation procedure with Rel-15 SCell activation/deactivation delay and fast SCell activation/deactivation delay described in Method-1.

Example 8 may include the enhanced MAC CEs in example 7 or some other example herein, wherein can be identified by the LCIDs as in Rel-15 MAC CE.

Example 9 may include an enhanced fast SCell Activation/Deactivation MAC CEs of one and four octet(s) in example 8 have fixed size and consist of one and four octets containing seven C-fields and one F-field.

Example 10 may include the enhanced SCell Activation/Deactivation MAC CE with one and four octets are illustrated in FIGS. 11 and 12, respectively.

Example 11 may include the fields of enhanced SCell activation/deactivation MAC CEs illustrated in FIGS. 4 and 5 are defined as follows: Ci: If there is an SCell configured for the MAC entity with SCellIndex i as specified in TS 38.331, this field indicates the activation/deactivation status of the SCell with SCellIndex else the MAC entity shall ignore the Ci field. The Ci field is set to "1" to indicate that the SCell with SCellIndex i shall be activated. The Ci field is set to "0" to indicate that the SCell with SCellIndex i shall be deactivated; F: Flag bit. If the field is set to "0", the Rel-15 SCell activation/deactivation timing procedure is applied. If the field is set to "1", slot level based fast SCell activation/deactivation timing procedure described in FIG. 8 is applied.

Example 12 may include new DCI field or redefined Rel-15 DCI field can be used to indicate the SCell activation/deactivation command.

Example 13 may include when UE receives SCell deactivation command at slot n, UE can immediately enter the SCell deactivation mode at slot n+1.

Example 14 may include when remaining SCell deactivation state, UE can monitor the configured SCell activation DCI to determine whether to activate the SCell or remain in the deactivated state.

Example 15 may include the periodicity of configured SCell activation DCI search space (SS) can be set to the maximum allowed latency value for the service with the most stringent latency requirement.

Example 16 may include SCell deactivation DCI format can also signal the characteristics of SCell deactivated state to control UE operation during SCell deactivated state.

Example 17 may include the following operations signaled by SCell deactivation DCI format: CSI-report indicator: whether UE can still perform CSI reporting for the deactivated SCell, PUCCH transmission indicator: whether PUCCH resources if configured, are still available for PUCCH transmission. SRS transmission indicator: whether UE can still transmit configured SRS in the deactivated SCell.

Example 18 may include a method comprising: receiving, from a serving cell, a MAC CE including a plurality of bits, wherein individual bits indicate whether respective secondary cells (SCells) of a wireless cellular network are activated or deactivated; determining an activation delay time for one or more activated. SCells indicated by the MAC CE based on a numerology of the serving cell; and communicating on the one or more activated SCells based on the determined activation delay time.

Example 19 may include the method of example 18 or another example herein, wherein the numerology includes a subcarrier spacing and/or symbol length used by the serving cell.

Example 20 may include the method of example 18-19 or another example herein, wherein the MAC CE includes a MAC PDU sub-header with an LCID to indicate a size of the MAC CE.

Example 21 may include the method of example 20 or another example herein, wherein the size is one octet or four octets.

Example 22 may include the method of example 18-21 or another example herein, wherein the LCID is different from an LCID used for a 3GPP Release 15 SCell activation/deactivation timing.

Example 23 may include the method of example 18-21 or another example herein, wherein the MAC CE further includes an indicator to indicate that the activation delay time is to be determined based on the numerology of the serving cell.

Example 24 may include the method of example 23 or another example herein, wherein the indicator is a single bit.

Example 25 may include the method of example 23-24 or another example herein, wherein the MAC CE is a first MAC CE, wherein the indicator is a first indicator with a first value, wherein the activation delay time is a first activation delay time, and wherein the method further comprises receiving a second MAC CE with a second indicator to indicate that a second activation delay time is to be used for one or more activated SCells indicated by the second MAC CE.

Example 26 may include the method of example 25, wherein the second activation delay time is determined according to a 3GPP Release 15 procedure.

Example 27 may include the method of example 18-26 or another example herein, wherein the numerology includes a PDSCH to HARQ-ACK response delay that is received via DCI.

Example 28 may include the method of example 18-27, wherein the method is performed by a UE or a portion thereof.

Example 29 may include a method to be performed by a UE or a portion thereof, the method comprising:
receiving a DCI to indicate deactivation of an SCell of a wireless cellular network, wherein the DCI includes one or more of: a CSI report indicator to indicate whether the UE is to perform CSI reporting for the deactivated SCell; a PUCCH transmission indicator to indicate whether PUCCH resources on the SCell, if configured, are still available for PUCCH transmission; or an SRS transmission indicator to indicate whether the LE is to transmit configured SRS in the deactivated SCell; and communicating on the wireless cellular network based on the DCI.

Example 30 may include the method of example 29 or another example herein, further comprising: entering a SCell deactivation mode based on the DCI; and when in the SCell deactivation mode, monitoring for the SCell activation DCI to indicate that the SCell is activated.

Example 31 may include the method of example 30 or another example herein, wherein the UE is to enter the SCell deactivation mode in a next subframe after a subframe in which the DCI is received.

Example 32 may include the method of example 30-31, further comprising receiving configuration information for monitoring for the SCell activation DCI.

Example 33 may include the method of example 30-32 or another example herein, wherein the SCell activation DCI is to indicate whether the SCell is activated or whether the SCell is to remain in the deactivated state.

Example 34 may include the method of example 30-33 or another example herein, further comprising receiving the SCell activation DCI and activating the SCell based on the SCell activation DCI.

Example 35 may include the method of example 29-34, wherein the DCI includes deactivation information for multiple SCells.

Example 36 may include an apparatus comprising means to perform one or more elements of a method described in or related to any of examples 1-35, or any other method or process described herein.

Example 37 may include one or more non-transitory computer-readable media comprising instructions to cause an electronic device, upon execution of the instructions by one or more processors of the electronic device, to perform one or more elements of a method described in or related to any of examples 1-35, or any other method or process described herein.

Example 38 may include an apparatus comprising logic, modules, or circuitry to perform one or more elements of a method described in or related to any of examples 1-35, or any other method or process described herein.

Example 39 may include a method, technique, or process as described in or related to any of examples 1-35, or portions or parts thereof.

Example 40 may include an apparatus comprising: one or more processors and one or more computer-readable media comprising instructions that, when executed by the one or more processors, cause the one or more processors to perform the method, techniques, or process as described in or related to any of examples 1-35, or portions thereof.

Example 41 may include a signal as described in or related to any of examples 1-35, or portions or parts thereof.

Example 42 may include a datagram, packet, frame, segment, protocol data unit (PDU), or message as described in or related to any of examples 1-35, or portions or parts thereof, or otherwise described in the present disclosure.

Example 43 may include a signal encoded with data as described in or related to any of examples 1-35, or portions or parts thereof, or otherwise described in the present disclosure.

Example 44 may include a signal encoded with a datagram, packet, frame, segment, protocol data unit (PDU), or message as described in or related to any of examples 1-35, or portions or parts thereof, or otherwise described in the present disclosure.

Example 45 may include an electromagnetic signal carrying computer-readable instructions, wherein execution of the computer-readable instructions by one or more processors is to cause the one or more processors to perform the method, techniques, or process as described in or related to any of examples 1-35, or portions thereof.

Example 46 may include a computer program comprising instructions, wherein execution of the program by a processing element is to cause the processing element to carry out the method, techniques, or process as described in or related to any of examples 1-35, or portions thereof.

Example 47 may include a signal in a wireless network as shown and described herein.

Example 48 may include a method of communicating in a wireless network as shown and described herein.

Example 49 may include a system for providing wireless communication as shown and described herein.

Example 50 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A method for communicating on a secondary cell (SCell) with fast activation or deactivation, the method comprising:
    receiving, from a serving cell, a medium access control (MAC) control element (CE) including a plurality of bits, wherein individual bits of the plurality of bits each indicate whether respective secondary cells (SCells) are activated or deactivated;
    based on a numerology of the serving cell, determining an activation delay time for one or more SCells indicated by the plurality of bits of the MAC CE, the activation delay time being indicated by the MAC CE;
    causing activation of the one or more SCells at a first slot after the activation delay time; and
    communicating using the one or more activated SCells based on the determined activation delay time.

2. The method of claim 1, wherein the determined activation delay time is less than 5 milliseconds.

3. The method of claim 1, wherein the determined activation delay time is based on physical downlink shared channel (PDSCH) to hybrid automatic repeat request acknowledgement (HARQ-ACK) response delay that is signaled in downlink control information (DCI).

4. The method of claim 1, wherein the numerology includes a subcarrier spacing or a symbol length used by the serving cell.

5. The method of claim 1, wherein the MAC CE includes a MAC PDU subheader with a logical channel ID (LCID) to indicate a size of the MAC CE.

6. The method of claim 5, wherein the size pf the MAC CE is either one octet or four octets.

7. The method of claim 5, wherein the LCID is not included in a set of LCIDs used for a 3GPP Release 15 SCell activation or deactivation timing.

8. The method of claim 1, wherein the MAC CE includes an indicator to indicate that the activation delay time is to be determined based on the numerology of the serving cell.

9. The method of claim 8, wherein the indicator is a single bit.

10. The method of claim 8, wherein the MAC CE is a first MAC CE, wherein the indicator is a first indicator with a first value, wherein the activation delay time is a first activation delay time, and wherein the method further comprises:
    receiving a second MAC CE with a second indicator to indicate that a second activation delay time is to be used for one or more activated SCells indicated by the second MAC CE.

11. The method of claim 10, wherein the second activation delay time is determined according to a 3GPP Release 15 procedure.

12. An apparatus comprising one or more processors configured to, when executing instructions stored in a memory, perform operations comprising:
    decoding a medium access control (MAC) control element (CE) received from a serving cell, the MAC CE including a plurality of bits, wherein individual bits of the plurality of bits each indicate whether respective secondary cells (SCells) are activated or deactivated;
    based on a numerology of the serving cell, determining an activation delay time for one or more activated SCells indicated by the plurality of bits of the MAC CE, the activation delay time being indicated by the MAC CE;
    encoding channel state information (CSI) for the one or more SCells at a first slot after the activation delay time; and
    communicating using the one or more activated SCells based on the determined activation delay time.

13. The apparatus of claim 12, wherein the determined activation delay time is based on physical downlink shared channel (PDSCH) to hybrid automatic repeat request acknowledgement (HARQ-ACK) response delay that is signaled in downlink control information (DCI).

* * * * *